US012726833B2

(12) United States Patent
Li et al.

(10) Patent No.: US 12,726,833 B2
(45) Date of Patent: Sep. 1, 2026

(54) TECHNIQUES FOR SIDELINK BEAM MEASUREMENT GAP FOR TRANSMITTING SIDELINK REFERENCE SIGNAL BLOCK BURSTS

(71) Applicant: QUALCOMM Incorporated, San Diego, CA (US)

(72) Inventors: Qing Li, Princeton Junction, NJ (US); Sourjya Dutta, San Diego, CA (US); Kapil Gulati, Belle Mead, NJ (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 394 days.

(21) Appl. No.: 18/360,460

(22) Filed: Jul. 27, 2023

(65) Prior Publication Data

US 2024/0114353 A1 Apr. 4, 2024

Related U.S. Application Data

(60) Provisional application No. 63/377,488, filed on Sep. 28, 2022.

(51) Int. Cl.
*H04W 16/28* (2009.01)
*H04L 5/00* (2006.01)

(52) U.S. Cl.
CPC ........... *H04W 16/28* (2013.01); *H04L 5/0051* (2013.01)

(58) Field of Classification Search
CPC .............................. H04W 16/28; H04W 76/14
USPC .................................................. 370/329–330
See application file for complete search history.

(56) References Cited

U.S. PATENT DOCUMENTS

2018/0343132 A1 11/2018 Maheshwari et al.
2019/0394666 A1* 12/2019 Li ........................ H04W 72/046
2020/0022040 A1* 1/2020 Chen .................. H04W 72/046
2020/0022089 A1 1/2020 Guo
2021/0314966 A1* 10/2021 Hui ....................... H04W 72/56
2021/0315057 A1* 10/2021 Baek ..................... H04W 76/10
2023/0171738 A1* 6/2023 Di Girolamo ........ H04W 72/56 370/329
2023/0198604 A1* 6/2023 Bhamri ................ H04B 7/0695 375/347

FOREIGN PATENT DOCUMENTS

WO WO-2022018688 A1 1/2022
WO WO-2022189174 A1 9/2022

OTHER PUBLICATIONS

International Search Report and Written Opinion—PCT/US2023/071241—ISA/EPO—Nov. 15, 2023.

(Continued)

*Primary Examiner* — Candal Elpenord
(74) *Attorney, Agent, or Firm* — Harrity & Harrity, LLP

(57) ABSTRACT

Various aspects of the present disclosure generally relate to wireless communication. In some aspects, a user equipment (UE) may transmit, to one or more other UEs, one or more sidelink reference signal block (S-RSB) bursts in a sidelink beam measurement gap (SBMG) based at least in part on one or more SBMG configurations. The UE may receive, from the one or more other UEs, one or more beam reports or beam measurement reports based at least in part on the one or more S-RSB bursts and the one or more SBMG configurations. Numerous other aspects are described.

28 Claims, 17 Drawing Sheets

(56) References Cited

OTHER PUBLICATIONS

LG Electronics: “Discussion on Potential Solutions for SL Positioning”, 3GPP TSG RAN WG1 Meeting #109-e, R1-2203720, 3rd Generation Partnership Project, Mobile Competence Centre, 650, Route Des Lucioles, F-06921 Sophia-Antipolis Cedex, France, vol. RAN WG1, No. Electronics, May 9, 2022-May 20, 2022, Apr. 29, 2022, 15 Pages, XP052153139, section 3, p. 4-5, section 4, p. 5-7, section 5, p. 8-9, p. 5, paragraph 4 p. 8, paragraph 5, p. 11, last paragraph-p. 12, first paragraph.

* cited by examiner

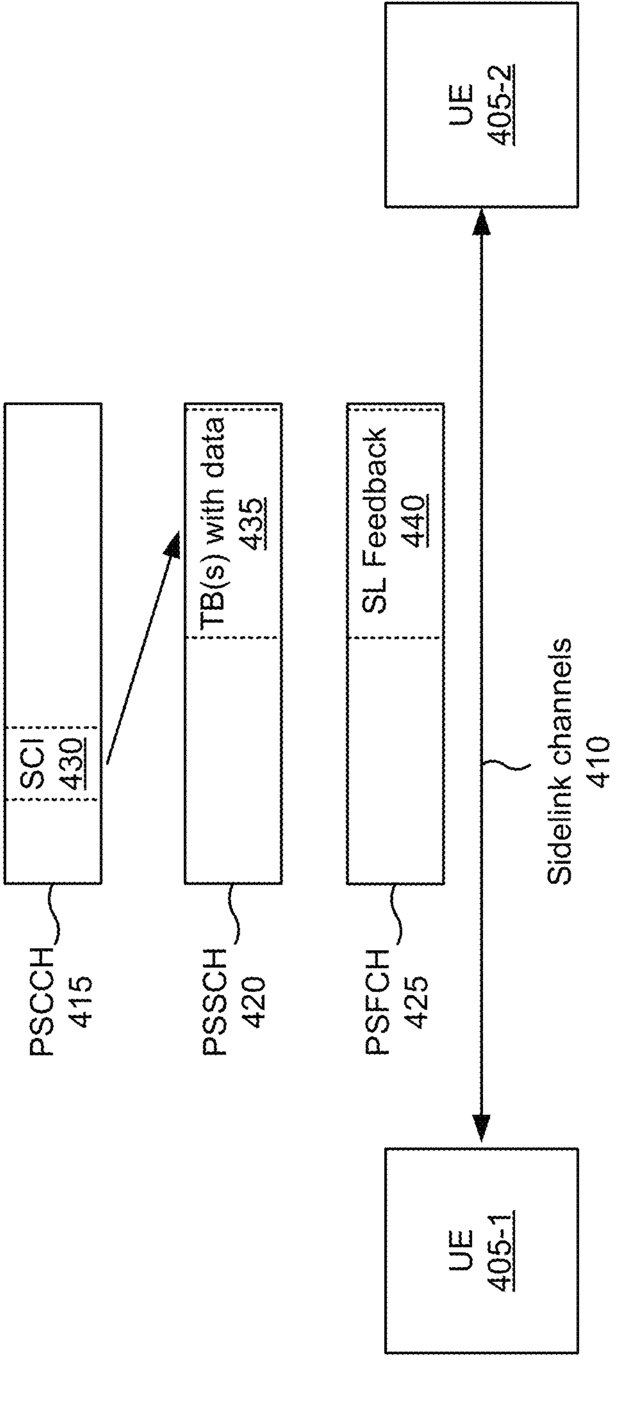
FIG. 4

500

800
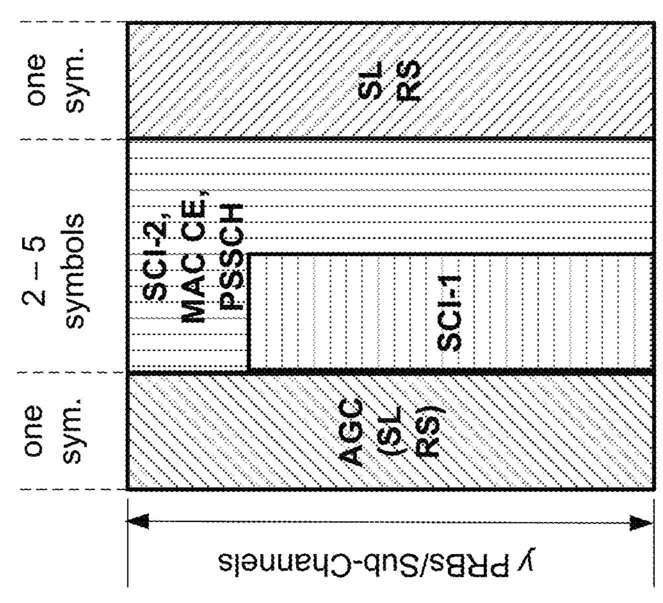
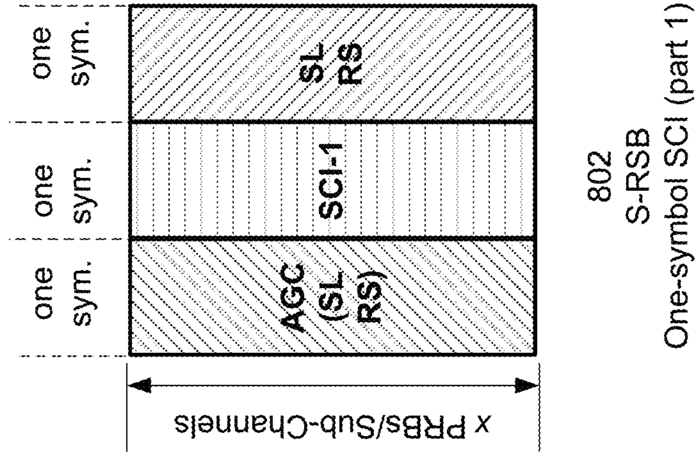
FIG. 8

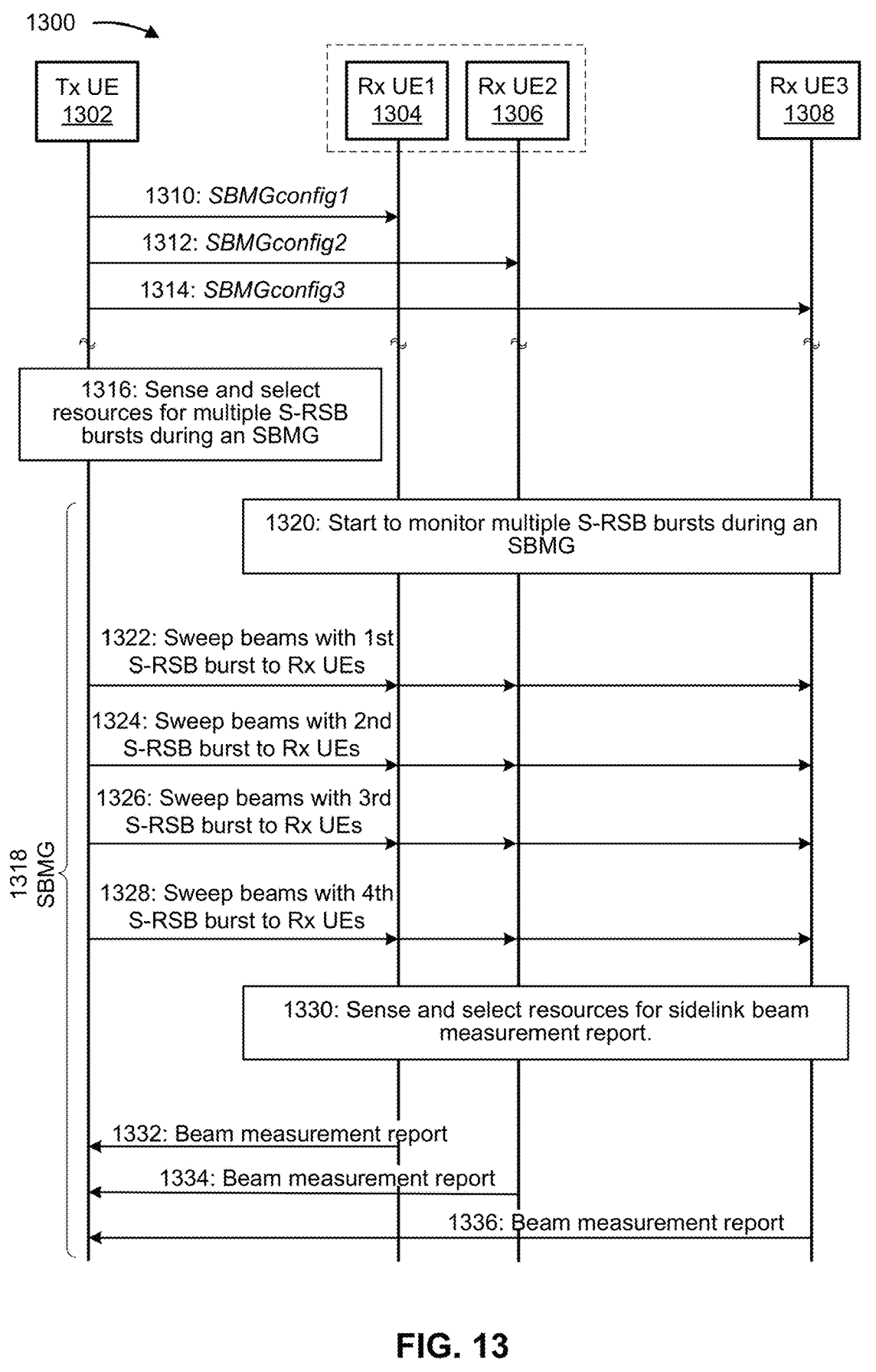

1300

Tx UE 1302

Rx UE1 1304

Rx UE2 1306

Rx UE3 1308

1310: *SBMGconfig1*

1312: *SBMGconfig2*

1314: *SBMGconfig3*

1316: Sense and select resources for multiple S-RSB bursts during an SBMG

1318 SBMG

1320: Start to monitor multiple S-RSB bursts during an SBMG

1322: Sweep beams with 1st S-RSB burst to Rx UEs

1324: Sweep beams with 2nd S-RSB burst to Rx UEs

1326: Sweep beams with 3rd S-RSB burst to Rx UEs

1328: Sweep beams with 4th S-RSB burst to Rx UEs

1330: Sense and select resources for sidelink beam measurement report.

1332: Beam measurement report

1334: Beam measurement report

1336: Beam measurement report

FIG. 13

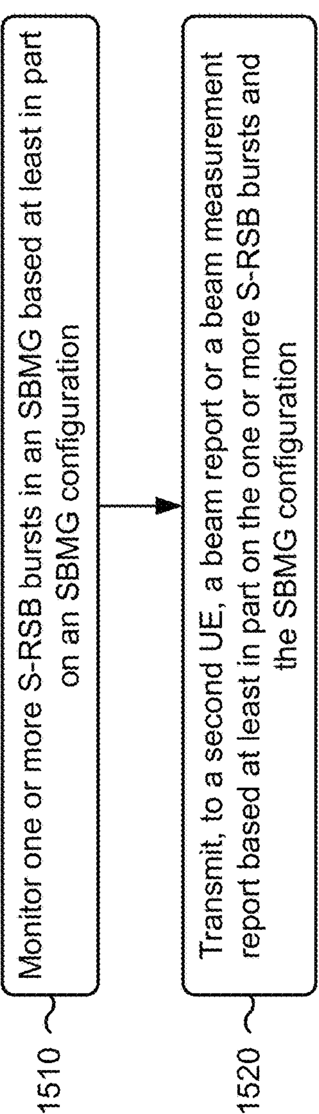
Monitor one or more S-RSB bursts in an SBMG based at least in part on an SBMG configuration
1510
Transmit, to a second UE, a beam report or a beam measurement report based at least in part on the one or more S-RSB bursts and the SBMG configuration
1520
1500
FIG. 15

TECHNIQUES FOR SIDELINK BEAM MEASUREMENT GAP FOR TRANSMITTING SIDELINK REFERENCE SIGNAL BLOCK BURSTS

CROSS-REFERENCE TO RELATED APPLICATION

This Patent Application claims priority to U.S. Provisional Patent Application No. 63/377,488, filed on Sep. 28, 2022, entitled "TECHNIQUES AND APPARATUSES FOR SIDELINK BEAM MEASUREMENT GAP FOR TRANSMITTING SIDELINK REFERENCE SIGNAL BLOCK BURSTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a sidelink beam measurement gap for transmitting sidelink reference signal block bursts.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include transmitting, to one or more other UEs, one or more sidelink reference signal block (S-RSB) bursts in a sidelink beam measurement gap (SBMG) based at least in part on one or more SBMG configurations. The method may include receiving, from the one or more other UEs, one or more beam reports or beam measurement reports based at least in part on the one or more S-RSB bursts and the one or more SBMG configurations.

Some aspects described herein relate to a method of wireless communication performed by a first UE. The method may include monitoring one or more S-RSB bursts in an SBMG based at least in part on an SBMG configuration. The method may include transmitting, to a second UE, a beam report or a beam measurement report based at least in part on the one or more S-RSB bursts and the SBMG configuration.

Some aspects described herein relate to a UE for wireless communication. The UE may include one or more memories and one or more processors coupled to the one or more memories. The one or more processors individually or collectively may be configured to transmit, to one or more other UEs, one or more S-RSB bursts in an SBMG based at least in part on one or more SBMG configurations. The one or more processors individually or collectively may be configured to receive, from the one or more other UEs, one or more beam reports or beam measurement reports based at least in part on the one or more S-RSB bursts and the one or more SBMG configurations.

Some aspects described herein relate to a first UE for wireless communication. The first UE may include one or more memories and one or more processors coupled to the one or more memories. The one or more processors individually or collectively may be configured to monitor one or more S-RSB bursts in an SBMG based at least in part on an SBMG configuration. The one or more processors individually or collectively may be configured to transmit, to a second UE, a beam report or a beam measurement report based at least in part on the one or more S-RSB bursts and the SBMG configuration.

Some aspects described herein relate to a non-transitory computer-readable medium that stores a set of instructions for wireless communication by a UE. The set of instructions, when executed by one or more processors of the UE, may cause the UE to transmit, to one or more other UEs, one or more S-RSB bursts in an SBMG based at least in part on one or more SBMG configurations. The set of instructions, when executed by one or more processors of the UE, may cause the UE to receive, from the one or more other UEs, one or more beam reports or beam measurement reports based at least in part on the one or more S-RSB bursts and the one or more SBMG configurations.

Some aspects described herein relate to a non-transitory computer-readable medium that stores a set of instructions for wireless communication by a first UE. The set of instructions, when executed by one or more processors of the first UE, may cause the first UE to monitor one or more S-RSB bursts in an SBMG based at least in part on an SBMG configuration. The set of instructions, when executed by one or more processors of the first UE, may cause the first UE to transmit, to a second UE, a beam report or a beam measurement report based at least in part on the one or more S-RSB bursts and the SBMG configuration.

Some aspects described herein relate to an apparatus for wireless communication. The apparatus may include means for transmitting, to one or more UEs, one or more S-RSB bursts in an SBMG based at least in part on one or more SBMG configurations. The apparatus may include means for receiving, from the one or more UEs, one or more beam reports or beam measurement reports based at least in part on the one or more S-RSB bursts and the one or more SBMG configurations.

Some aspects described herein relate to an apparatus for wireless communication. The apparatus may include means for monitoring one or more S-RSB bursts in an SBMG based at least in part on an SBMG configuration. The apparatus may include means for transmitting, to a UE, a beam report or a beam measurement report based at least in part on the one or more S-RSB bursts and the SBMG configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of sidelink communications, in accordance with the present disclosure.

FIG. 8 is a diagram illustrating an example of sidelink reference signal blocks (S-RSBs), in accordance with the present disclosure.

FIG. 13 is a diagram of an example associated with sidelink beam measurement and reporting, in accordance with the present disclosure.

FIG. 15 is a diagram illustrating an example process performed, for example, by a first UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
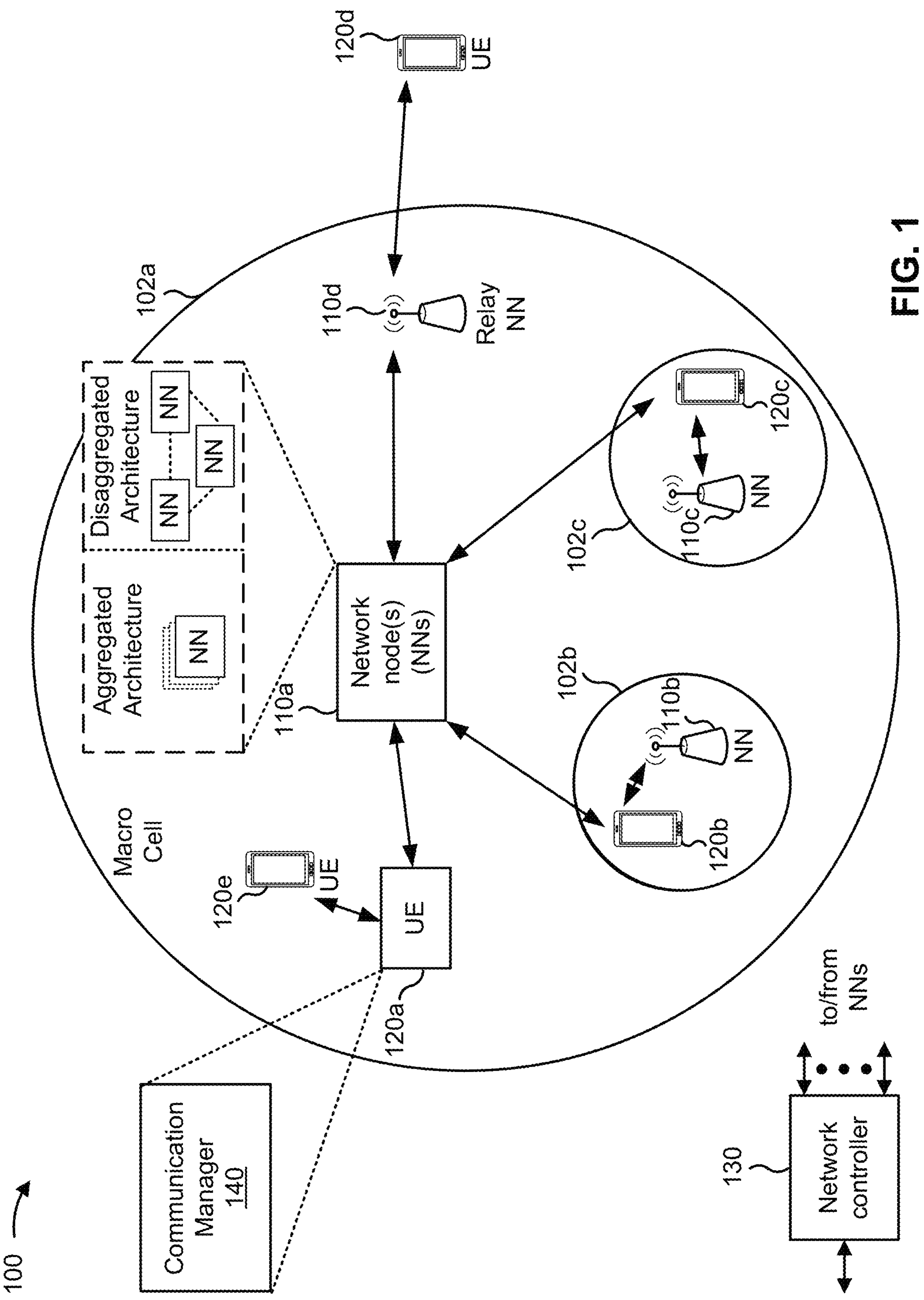
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to one or more other UEs, one or more sidelink reference signal block (S-RSB) bursts in a sidelink beam measurement gap (SBMG) based at least in part on one or more SBMG configurations; and receive, from the one or more other UEs, one or more beam reports or beam measurement reports based at least in part on the one or more S-RSB bursts and the one or more SBMG configurations. Additionally, or alternatively, the communication manager 140 may monitor one or more S-RSB bursts in an SBMG based at least in part on an SBMG configuration; and transmit, to another UE, a beam report or a beam measurement report based at least in part on the one or more S-RSB bursts and the SBMG configuration. Additionally, or alternatively, the communication manager 140 may perform one or more other operations described herein.

As indicated above, FIG. 1 is provided as an example. Other examples may differ from what is described with regard to FIG. 1.

Figure 2:
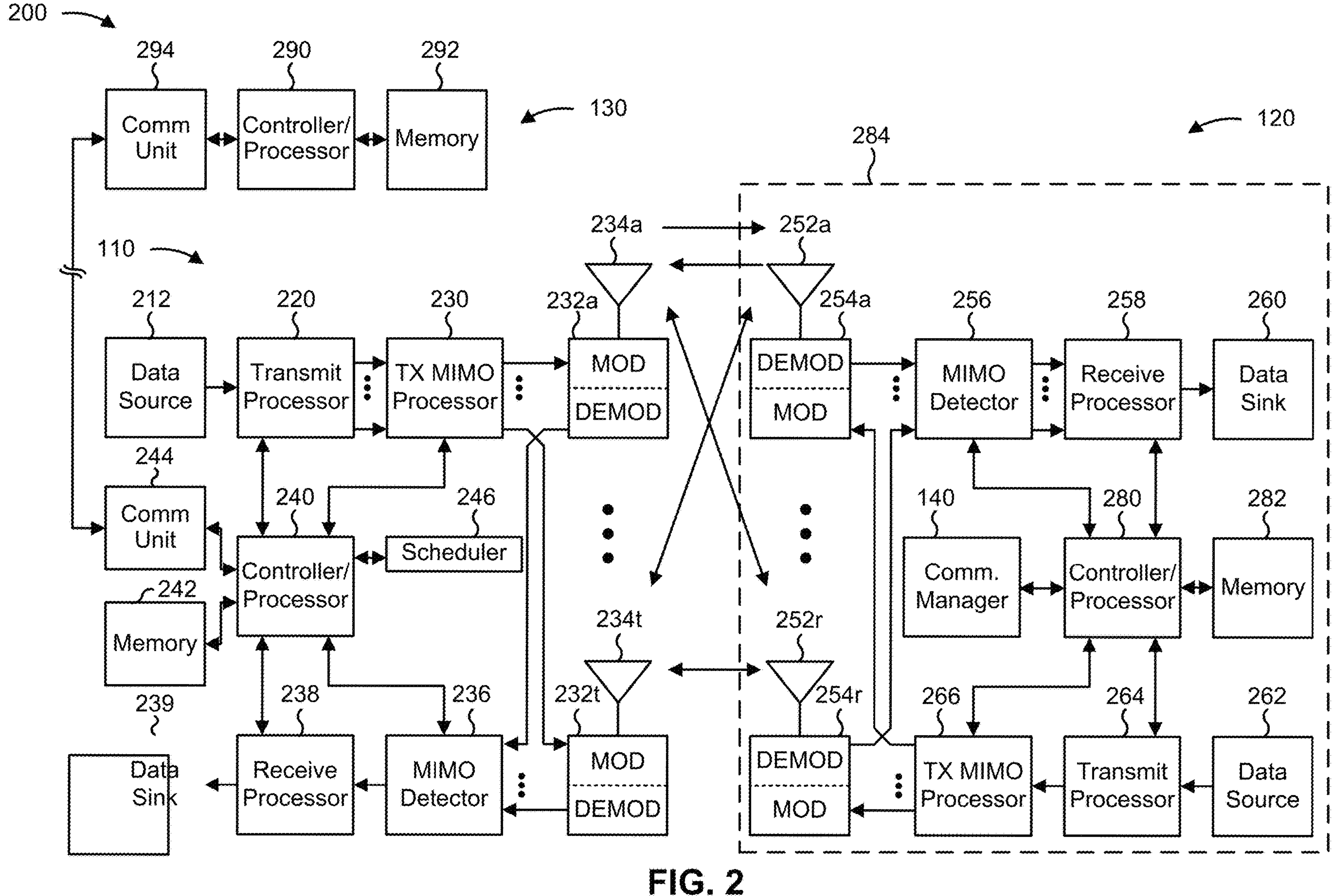
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 10-17).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 10-17).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with a sidelink beam measurement gap for transmitting sidelink reference signal block bursts, as described in more detail elsewhere herein. For example, the controller/processor 240 of the network node 110, the controller/processor 280 of the UE 120, or any other component(s) (or combinations of components) of FIG. 2 may perform or direct operations of, for example, process 1400 of FIG. 14, process 1500 of FIG. 15, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, the UE 120 includes means for transmitting, to one or more other UEs, one or more S-RSB bursts in an SBMG based at least in part on one or more SBMG configurations; and/or means for receiving, from the one or more other UEs, one or more beam reports or beam measurement reports based at least in part on the one or more S-RSB bursts and the one or more SBMG configurations. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for monitoring one or more S-RSB bursts in an SBMG based at least in part on an SBMG configuration; and/or means for transmitting, to another UE, a beam report or a beam measurement report based at least in part on the one or more S-RSB bursts and the SBMG configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
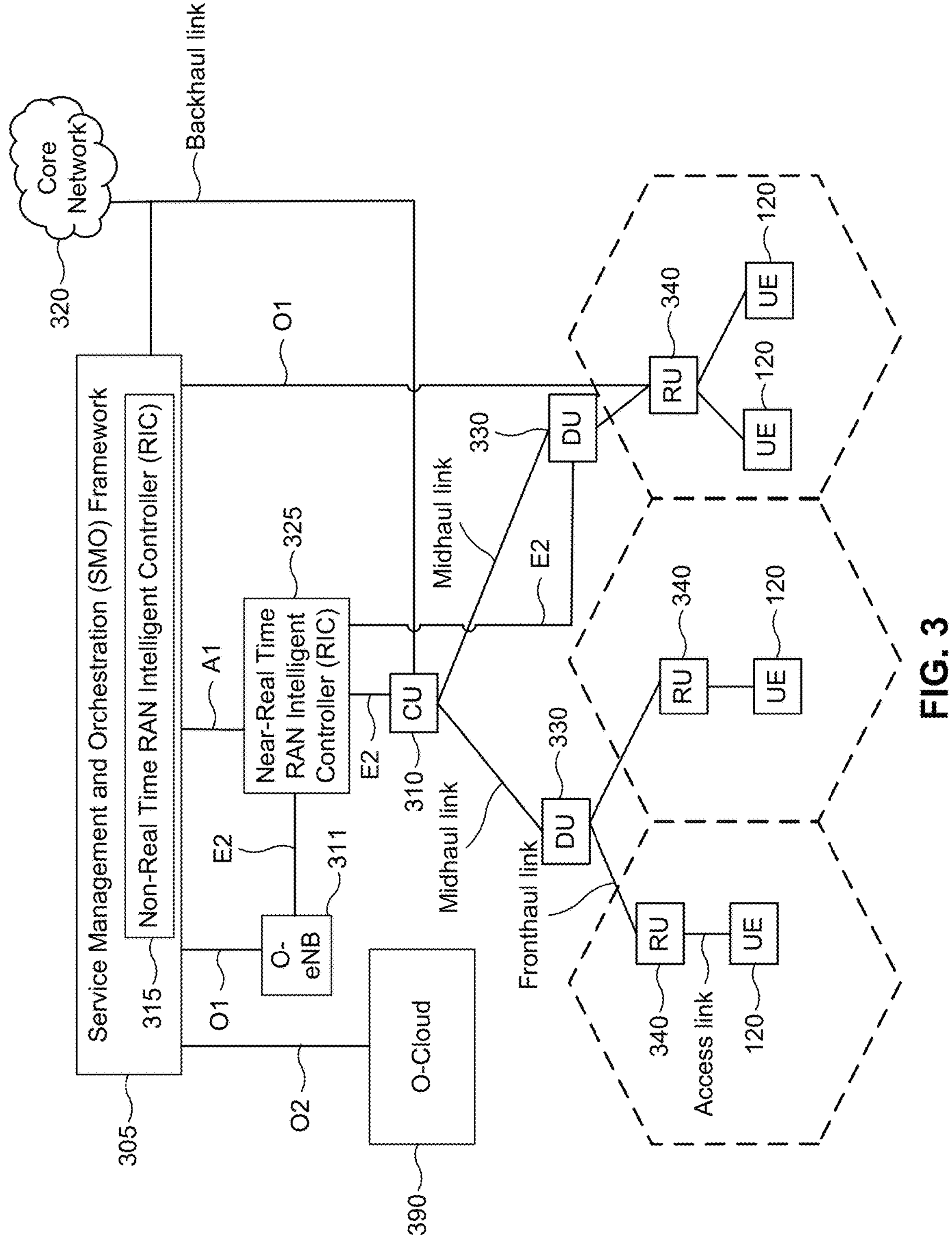
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink resource allocation mode (e.g., Mode 1) where resource selection and/or scheduling is performed by a network node 110 (e.g., a base station, a CU, or a DU). For example, the UE 405 may receive a grant (e.g., in downlink control information (DCI) or in an RRC message, such as for configured grants) from the network node 110 (e.g., directly or via one or more network nodes) for sidelink channel access and/or scheduling. In some aspects, a UE 405 may operate using a sidelink resource allocation mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the resource allocation mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
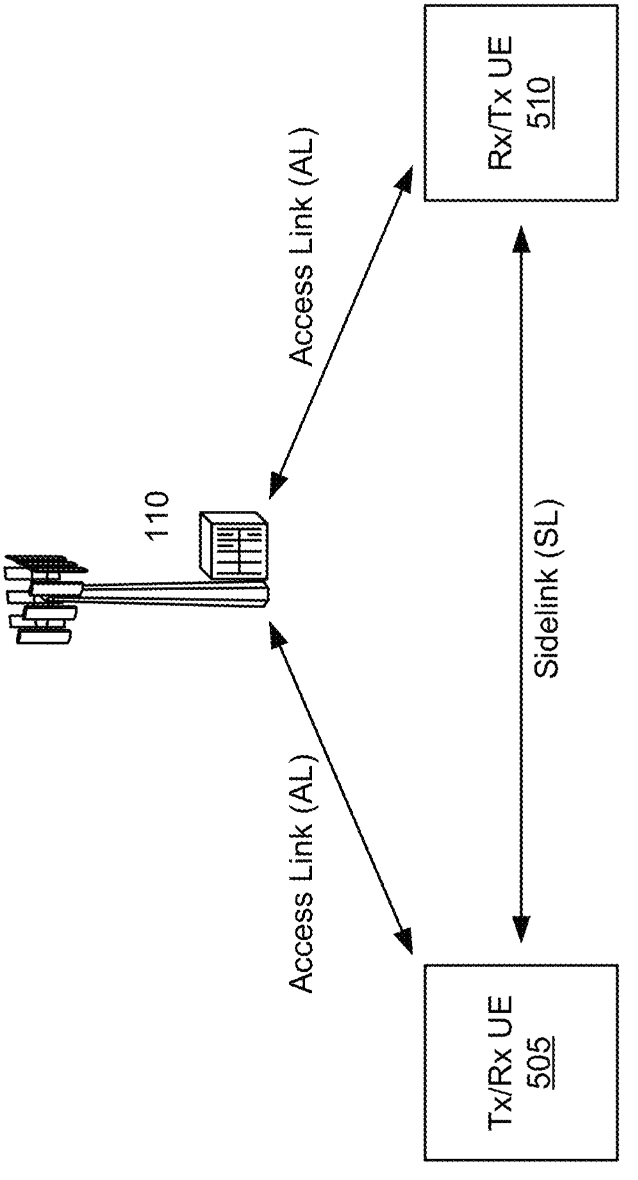
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link Additionally, or alternatively, in some sidelink resource allocation modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link Sidelink communications may be transmitted via the sidelink, and access link communications may be transmitted via the access link. An access link communication may be either a downlink communication (from a network node 110 to a UE 120) or an uplink communication (from a UE 120 to a network node 110).

In some examples, one or more of the wireless communication devices shown in FIG. 5 (e.g., the network node 110, the Tx/Rx UE 505, and/or the Rx/Tx UE 510) may communicate via beamforming techniques. For example, the network node 110 may communicate with one or both of the Tx/Rx UE 505 and the Rx/Tx UE 510 by employing beamforming techniques associated with the respective access links, and/or the Tx/Rx UE 505 and the Rx/Tx UE 510 may communicate with each other by employing beamforming techniques associated with the sidelink Various features of beamforming techniques are described in more detail below in connection with FIG. 6.

As indicated above, FIG. 5 is provided as an example. Other examples may differ from what is described with respect to FIG. 5.

Figure 6:
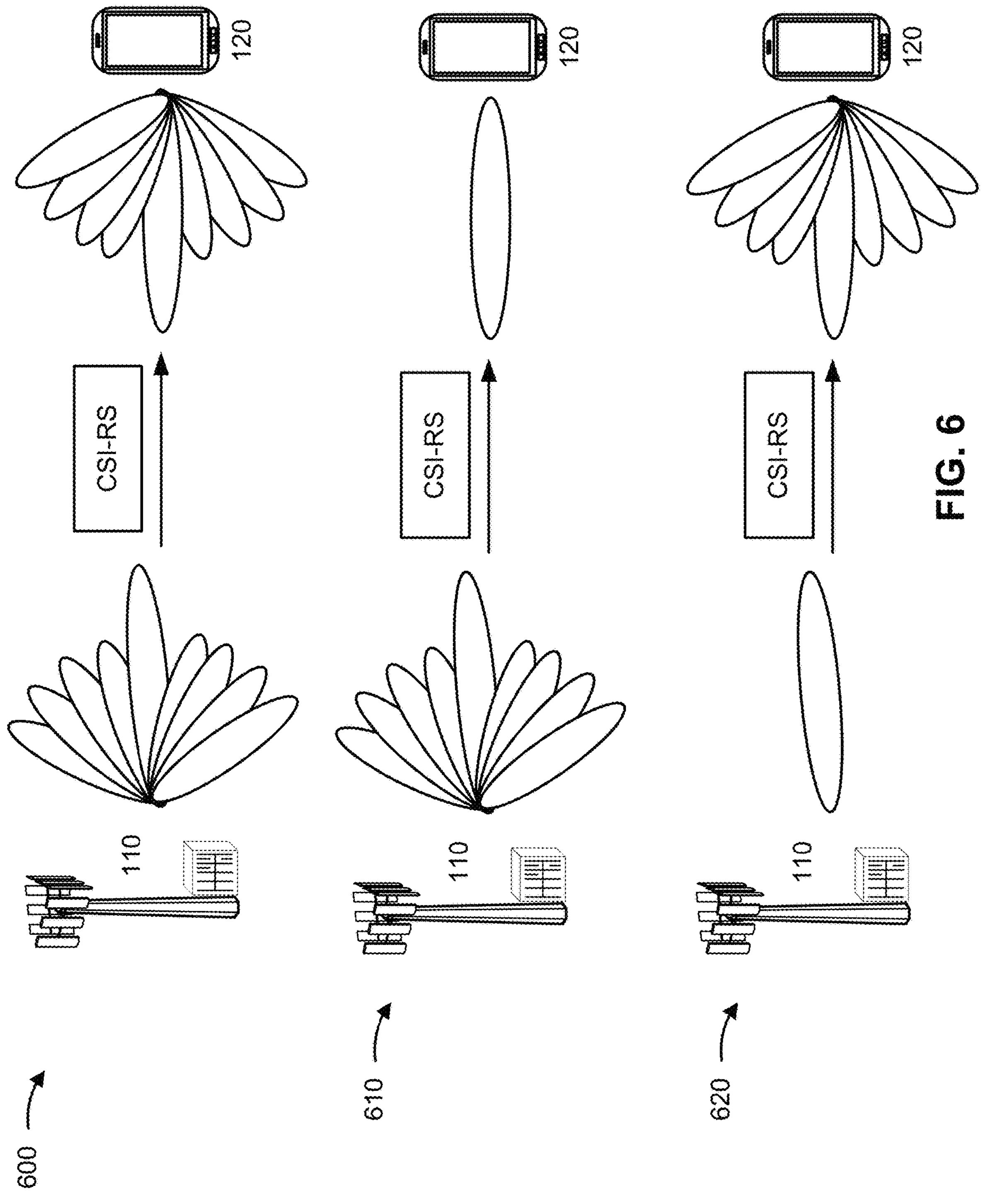
FIG. 6 is a diagram illustrating examples of channel state information reference signal beam management procedures, in accordance with the present disclosure.

FIG. 6 is a diagram illustrating examples 600, 610, and 620 of CSI reference signal (CSI-RS) beam management procedures, in accordance with the present disclosure. As shown in FIG. 6, examples 600, 610, and 620 include a UE 120 in communication with a network node 110 in a wireless network (e.g., wireless network 100). However, the devices shown in FIG. 6 are provided as examples, and the wireless network may support communication and beam management between other devices (e.g., between a UE 120 and a network node 110 or transmit receive point (TRP), between a mobile termination node and a control node, between an integrated access and backhaul (IAB) child node and an IAB parent node, and/or between a scheduled node and a scheduling node). In some aspects, the UE 120 and the network node 110 may be in a connected state (e.g., an RRC connected state). Moreover, as is described in more detail below, in some aspects similar beam management concepts described herein may be used to support beamformed communications between two UEs 120, such as the Tx/Rx UE 505 and the Rx/Tx UE 510 communicating on the sidelink.

As shown in FIG. 6, example 600 may include a network node 110 (e.g., one or more network node devices such as an RU, a DU, and/or a CU, among other examples) and a UE 120 communicating to perform beam management using CSI-RS s. Example 600 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 6 and example 600, CSI-RS s may be configured to be transmitted from the network node 110 to the UE 120. The CSI-RS s may be configured to be periodic (e.g., using RRC signaling), semi-persistent (e.g., using MAC control element (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 600 has been described in connection with CSI-RS s, the first beam management process may also use synchronization signal blocks (SSBs) for beam management in a similar manner as described above.

As shown in FIG. 6, example 610 may include a network node 110 and a UE 120 communicating to perform beam management using CSI-RS s. Example 610 depicts a second beam management procedure (e.g., P2 beam management). The second beam management procedure may be referred to as a beam refinement procedure, a network node beam refinement procedure, a TRP beam refinement procedure, and/or a transmit beam refinement procedure. As shown in FIG. 6 and example 610, CSI-RSs may be configured to be transmitted from the network node 110 to the UE 120. The CSI-RS s may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 beam management). The third beam management procedure may be referred to as a beam refinement procedure, a UE beam refinement procedure, and/or a receive beam refinement procedure. As shown in FIG. 6 and example 620, one or more CSI-RS s may be configured to be transmitted from the network node 110 to the UE 120. The CSI-RS s may be configured to be aperiodic (e.g., using DCI). The third beam management process may include the network node 110 transmitting the one or more CSI-RS s using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

Similar beam management procedures may be used for sidelink beam management operations between UEs 120 (e.g., between the first UE 405-1 and the second UE 405-2 described above in connection with FIG. 4, between the Tx/Rx UE 505 and the Rx/Tx UE 510 described above in connection with FIG. 5, or similar UEs). Sidelink beam management operations may include initial beam pairing or beamforming, beam fine tuning, beam maintenance, and beam failure recovery. Beam fine tuning may involve selection of a beam direction and limited beam sweeping around the beam direction. The limited beam sweeping may use narrower beams and/or use more granularity in beam directions. In some cases, UEs 120 may employ the beam management procedures and/or beamforming communications on the sidelink when communicating in a high-frequency band, such as when communicating in FR2 or a similar high-frequency band. Features supporting beamforming in the sidelink are described in more detail below in connection with FIG. 7.

As indicated above, FIG. 6 is provided as an example of beam management procedures. Other examples of beam management procedures may differ from what is described with respect to FIG. 6. For example, the UE 120 and the network node 110 may perform the third beam management procedure before performing the second beam management procedure, and/or the UE 120 and the network node 110 may perform a similar beam management procedure to select a UE transmit beam.

Figure 7:
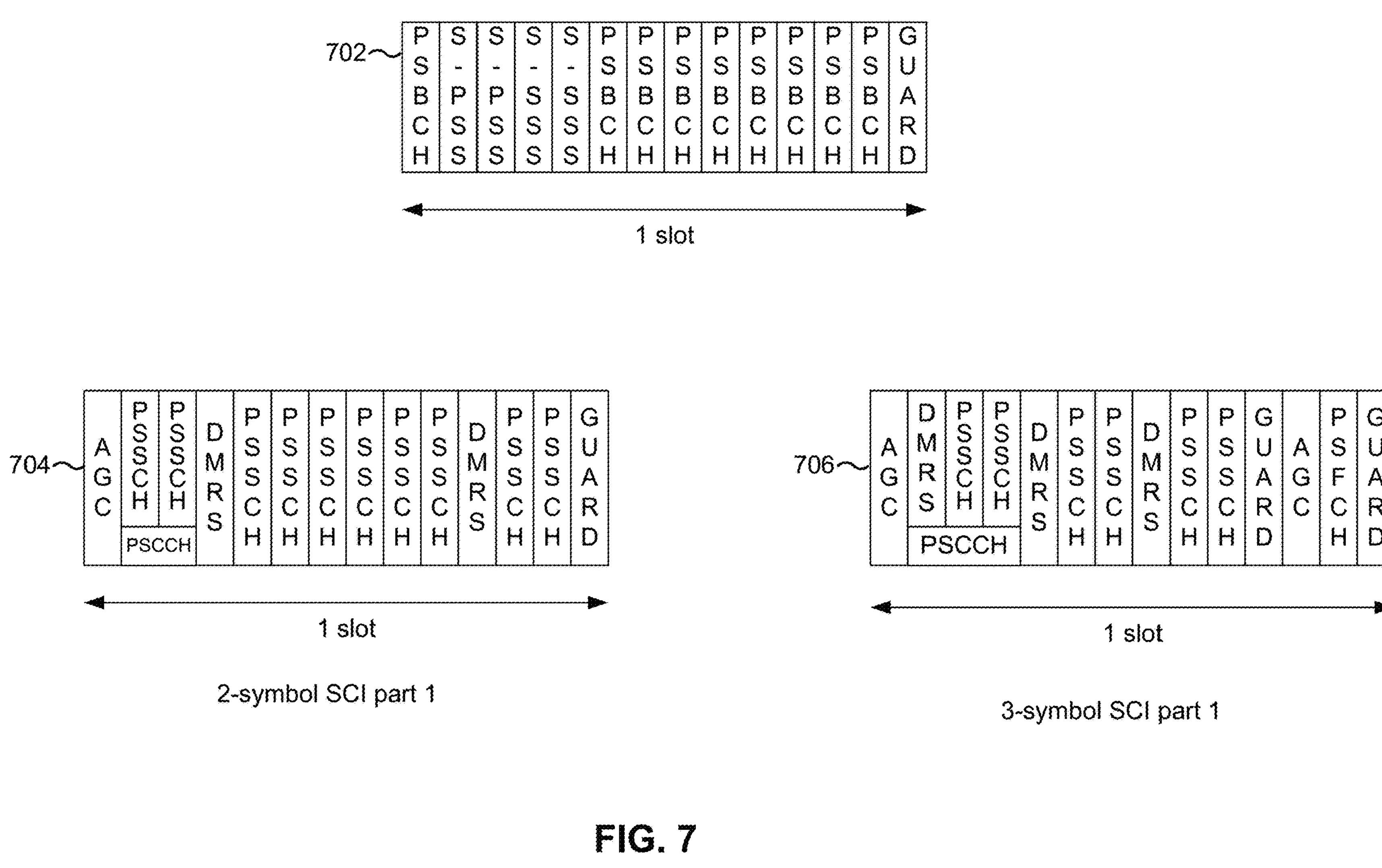
FIG. 7 is a diagram illustrating an example of various slot structures used to support beamformed communications in the sidelink, in accordance with the present disclosure.

FIG. 7 is a diagram illustrating an example 700 of various slot structures used to support beamformed communications in the sidelink, in accordance with the present disclosure.

First, reference number 702 shows an example slot structure used to transmit a sidelink SSB (S-SSB). In some cases, a sidelink synchronization procedure may define a hierarchy of priorities associated with different synchronization references (e.g., a GNSS reference, a synchronization reference transmitted by a network node 110, or a similar synchronization reference) for UEs 120 to synchronize communications in the sidelink. For example, in accordance with the sidelink synchronization procedure, UEs 120 communicating in the sidelink may continuously search the hierarchy of priorities in order to obtain synchronization information from a highest priority (e.g., highest quality) synchronization reference that a UE 120 can access.

In some cases, such as when a UE 120 is unable to locate a synchronization reference (e.g., a GNSS reference, a network node 110 reference, or the like), either directly or indirectly (e.g., relayed by another UE 120 or another wireless communication device), the UE 120 may use its own internal clock to transmit an S-SSB (sometimes referred to as a sidelink synchronization signal (S-SS)/physical sidelink broadcast channel (PSBCH) block (S-SS/PSBCH block)), such as the S-SSB shown by reference number 702. In some examples, the S-SSB may include a sidelink PSS (S-PSS), similar to a PSS transmitted on the access link, a sidelink SSS (S-SSS), similar to an SSS transmitted on the access link, and a PSBCH, similar to a physical broadcast (PBCH) transmitted on the access link. In some examples, the S-SSB may be transmitted in the sidelink with a period of 160 milliseconds (ms), during which one or multiple S-SSBs may be transmitted based on a numerology used for transmission. The S-SSB may cover a number of resource blocks (e.g., six resource blocks, eleven resource blocks, or another number of resource blocks) in the frequency domain, and may cover one slot in the time domain. For example, the S-SSB may span one slot in the time domain, and may span 132 subcarriers (e.g., eleven RBs) in the frequency domain. Two of the symbols of the S-SSB may be used for the S-PSS, two of the symbols of the S-SSB may be used for the S-SSS, nine of the symbols of the S-SSB may be used for the PSBCH, and one of the symbols of the S-SSB may be used as a guard symbol.

Reference numbers 704 and 706 show example slot structures used to transmit SCI, such as the SCI 430 described above in connection with FIG. 4. For example, the example slot structures may be used to transmit first-stage SCI (e.g., SCI-1), which may be transmitted with a PSSCH by a Tx UE, such as the Tx/Rx UE 505 described above in connection with FIG. 5. In some examples, the SCI (e.g., SCI-1) may be used to indicate to an Rx UE (e.g., the Rx/Tx UE 510 described above in connection with FIG. 5) time and/or frequency resources used for future transmissions with PSSCH. In some cases, the SCI transmissions may be used by sensing UEs 120 to maintain a record of which resources have been reserved by other UEs in the recent past. For semi-persistent scheduling (SPS)-based resource reservation, the SCI may include a field (sometimes referred to a resource reservation period field) that indicates a time period for periodic transmissions in the future.

In some cases, the SCI may be associated with a two-symbol SCI transmission, as shown in the example indicated by reference number 704. In such instances, the SCI may by transmitted in a PSCCH spanning two symbols of a slot (e.g., a second and third symbol of a slot). The SCI (and, more particularly, the PSCCH carrying the SCI) may be frequency-division multiplexed with other channels or communications, such as a PSSCH as shown in FIG. 7. The two-symbol SCI transmission may include additional channels, communications, or reference signals, such as an automatic gain control (AGC) symbol, one or more (e.g., two) DMRS symbols, additional PSSCH symbols, and a guard symbol.

In some other cases, the SCI may be associated with a three-symbol SCI transmission, as shown in the example indicated by reference number 704. In such instances, the SCI may by transmitted in a PSCCH spanning three symbols of a slot (e.g., a second, third, and fourth symbol of a slot). In this example, the SCI (and, more particularly, the PSCCH carrying the SCI) may be frequency-division multiplexed with one or more PSSCHs (e.g., a first PSSCH in the third symbol of the slot and a second PSSCH in the fourth symbol of the slot) as well as a DMRS (e.g., in the second symbol of the slot), as shown in FIG. 7. The three-symbol SCI transmission may include additional channels, communications, or reference signals, such as an AGC symbol, one or more (e.g., two) additional DMRS symbols, additional PSSCH symbols, a PSFCH symbol, an AGC symbol associated with the PSFCH symbol, and one or more (e.g., two) guard symbols.

In some cases, a Tx UE (e.g., the Tx/Rx UE 505) may transmit, to an Rx UE (e.g., Rx/Tx UE 510) one or more CSI-RSs, such as for purposes of establishing beamformed communications between the UEs, as described above in connection with FIG. 6. For example, for purposes of link adaptation and rank adaptation in unicast transmissions, a Tx UE may transmit a sidelink CSI-RS (SL CSI-RS) multiplexed with a PSSCH transmission. Additionally, or alternatively, a Tx UE may indicate via SCI (e.g., SCI-2) aperiodic sidelink CSI reporting from the Rx UE, such as via a MAC-CE communication, or a similar communication. In some examples, the Tx UE may wait to trigger another CSI report from a given Rx UE until a preceding report has been received, or until a latency bound (e.g., a configurable time period) has expired. Features of certain structures used to transmit reference signals between various UEs 120 communicating in the sidelink are described in more detail below in connection with FIG. 8.

For a sidelink unicast, a Tx UE may transmit SL CSI-RSs together with a data transmission on PSSCH using a slot, such as by utilizing one of the slot structures described above in connection with reference numbers 704 and 706. In such cases, the Tx UE may be limited to sweep SL CSI-RSs with one beam or one direction in one slot, which may cause undesired delay for beam measurements with the cost of many slots of sidelink resources. Additionally, a Tx UE may be paired with multiple Rx UEs for multiple sidelink unicasts, and thus the Tx UE may need to sweep SL CSI-RSs at slots associated with multiple sidelink unicasts respectively, which may increase the cost of beam measurements significantly. Moreover, a Tx UE may form multiple PC5 RRC connections with multiple Rx UEs (e.g., identified by layer 2 destination IDs) for multiple sidelink unicasts of multiple sidelink services or applications on a physical device (e.g., identified by a device ID). Accordingly, the Tx UE may sweep multiple SL CSI-RSs and receive multiple beam measurement reports for one physical beam redundantly.

Moreover, for sidelink communication in FR2 or other high-frequency spectrums, multiple narrow beams may be formed for better direction gain of a beam pair link (BPL), which may result in more beams to be swept and measured. Additionally, channels at FR2 and similar high-frequency bands may be dynamic, and thus frequent beam sweeping and measuring may be needed. As a result, paired UEs performing beam sweeping and other beam management operations may result in high power, computing, and network resource consumption.

In some cases, paired UEs (e.g., the first UE 405-1 and the second UE 405-2, and/or the Tx/Rx UE 505 and the Rx/Tx UE 510) for sidelink unicast communications may need to continuously monitor (e.g., via beam measurements) current serving beams and candidate beams to ensure reliable PC5 connection for meeting certain QoS requirements of a sidelink service, or for similar purposes. For example, when paired UEs are mobile and/or operating in a high frequency channel (e.g., FR2), channel conditions may frequently change, requiring the paired UEs to select updated beams in order to meet QoS requirements.

As indicated above, FIG. 7 is provided as an example. Other examples may differ from what is described with respect to FIG. 7.

FIG. 8 is a diagram illustrating an example 800 of sidelink reference signal blocks, in accordance with the present disclosure.

According to various aspects described herein, a sidelink UE (e.g., UE 405-1, UE 405-2, Tx/Rx UE 505, Rx/Tx UE 510, or a similar UE) may perform sensing-based beam sweeping and, based on the sensing, transmit S-RSBs (e.g., S-RSB 802, S-RSB 804), which may be shorter than an S-SSB, such as the S-SSB described above in connection with reference number 702 in FIG. 7. In this way, sidelink UEs may conserve power and signaling resources while reducing interference and latency.

Each S-RSB may include at least one RS and/or SCI that other UEs may use for beam management (e.g., using the RS) and resource sensing for beam sweeping or sidelink communication (e.g., based at least in part on the resource reservation indicated in the SCI, if included in an S-RSB transmission, and/or measurements, such as RSSI, RSRP, and/or the like). For example, S-RSB 802 is three symbols and includes a first RS that may be used for AGC, a one-symbol SCI, and a second RS for other beam management operations. The second RS may be used for beamforming, beam fine tuning, and/or beam measurement. The second RS may be the same as the first RS or different than the first RS. The first RS and/or the second RS may be a Zadoff-Chu (ZC) sequence or an m-sequence or sequences mapped to each resource element or sub-carrier of x physical resource blocks (PRBs) or sub-channels, similar to a Uu synchronization signal (e.g., a PSS-like or SSS-like signal with the sequence generated based on an identifier of a beam sweeping for a sidelink service, a sidelink communication, a Tx/Rx UE, an identifier or index of an RS of a beam sweeping, or an indication of a transmission configuration indicator (TCI) state of an RS of a beam sweeping). The RS may be a pseudo-random sequence mapped continuously (e.g., density as 1) or discontinuously over y PRBs or sub-channels (e.g., even PRBs with density 0.5), similar to a Uu CSI-RS (e.g., a CSI-RS-like signal with the sequence initiated with an identifier of a beam sweeping for a sidelink service, a sidelink communication, a Tx/Rx UE, or based on an identifier or index of an RS of a beam sweeping, or an indication of TCI state of an RS of a beam sweeping). In some aspects, the RS may be narrow band or subband based (e.g., occupying contiguously or non-contiguously a sub-range of PRBs or sub-channels of a resource pool). In some aspects, the RS may be wide band based (e.g., occupying contiguously or non-contiguously the full range of PRBs or sub-channels within a resource pool).

The SCI, if included in an S-RSB transmission, may indicate time and frequency resources reserved for one or more S-RSB transmissions. The SCI may indicate time and frequency resources used for future S-RSBs (e.g., reserved for a next few transmissions aperiodically (non-repeated bursts) or semi-persistently (repeated bursts)), such that other UEs are aware of the transmissions or transmission pattern of the S-RSBs. The other UEs may use the indication in the SCI to schedule transmissions and/or receptions around the S-RSBs to avoid transmission collisions (e.g., collisions between S-RSB bursts from different UEs or collisions between S-RSB bursts and other sidelink communications such as data transmissions, beam reports, and/or measurement reports from different UEs). The SCI may include beam information (e.g., sidelink TCI (SL TCI) state (e.g., SL-TCI-StateId) with QCL source and QCL type such as type A or type D for the RS of an S-RSB or QCL rooted from the S-RSB or spatial filter for specific receive beam parameter or for beam association or correspondence or spatial relationship information index or ID, a beam identifier or beam index of a beam used to transmit the S-RSB for beam association or resource mapping) and S-RSB information (e.g., S-RSB index of an S-RSB within an S-RSB burst for beam association or resource mapping, S-RSB burst structure or configuration for a UE to identify the proper S-RSB burst). The S-RSB burst structure or configuration information may include an S-RSB burst configuration index or ID (e.g., a codepoint of S-RSB burst duration and S-RSB burst period combined, based at least in part on a numerology configured for a sidelink bandwidth part (BWP)). The SCI may include a source identifier (ID), such as a Layer 1 (L1) source ID or a source ID derived from a Layer 2 (L2) source ID for identifying the transmitter of the one or more S-RSB bursts. For example, an Rx UE may determine whether to pair a receive beam with the Tx UE's transmit beam and whether to report the beam measurement to the Tx UE based at least in part on the Tx UE's ID. The SCI may include a destination ID, such as an L1 destination ID or a destination ID derived from an L2 destination ID for identifying an Rx UE with which the Tx UE may conduct beam sweeping for transmitting beam fine tuning or receiving beam fine tuning. The SCI may indicate a type of beam management operation, whether initial beamforming, beam fine tuning of transmit (Tx) beams, beam fine tuning of receive (Rx) beams, beam measurements, or beam recovery (e.g., an Rx UE may detect the proper S-RSB bust(s) for beamforming or beam fine tuning). In some aspects, an S-RSB transmission may be associated with a size of two symbols where the SCI and RS may be interleaved, or SCI may be excluded, based on the configuration of an S-RSB structure or an S-RSB burst structure, or the configuration for different beam management operations (e.g., initial beam pairing, beam fine tuning or monitoring, or beam recovery).

Additionally or alternatively, the SCI, if included in an S-RSB transmission, may include the SBMG information (e.g., a SBMG configuration index or ID) or beam measurement report information (e.g., beam measurement configuration index or ID or beam measurement report configuration index or ID).

In another example, S-RSB 804 spans 4-7 symbols and includes two or more symbols of SCI. The SCI may include SCI part 1 (e.g., carried on PSCCH) and SCI part 2 (e.g., carried on PSSCH). The SCI part 2 may indicate preferred resources or non-preferred resources (e.g., for a beam report or a beam measurement report) associated with the S-RSB of an S-RSB burst. Alternatively, the SCI part 2 may include the source ID, the destination ID, and/or other identifiers or indications for beam information, S-RSB information, S-RSB burst information, or information for a beam management operation (e.g., beam pairing, beam fine tuning, or beam monitoring). If the S-RSB is four symbols, the SCI part 2 may be included in the third symbol (and possibly part of the second symbol). If the S-RSB is five symbols, the SCI part 2 may be included in the third and fourth symbol (and possibly part of the second symbol). Additionally or alternatively, the SCI part 2 may include the SBMG information (e.g., an SBMG configuration index or ID), beam measurement report information (e.g., a beam measurement configuration index or ID or a beam measurement report configuration index or ID) associated with the S-RSB. The second RS may be included in the last symbol of an S-RSB (e.g., the fourth symbol for a four-symbol S-RSB or the fifth symbol for a five-symbol S-RSB). In some cases, an S-RSB may be associated with an S-RSB burst, which may include multiple S-RSBs transmitted at a configured periodicity or within a time window. In some aspects, the RS may be narrow band or subband based (e.g., with S-RSB spanning 3 or more than 3 symbols). In some aspects, the RS may be wide band based (e.g., with S-RSB spanning 3 or 4 or 5 symbols). Features of S-RSB bursts are described in more detail below in connection with FIG. 9.

Additionally or alternatively, the S-RSB may include multiple symbols for PSSCH (e.g., 2 or 3 or 4 or 5 symbols for PSSCH illustrated in connection with S-RSB 804) which may be multiplexed with SCI part 2, MAC CE or other sidelink logical control channel (e.g., sidelink common control channel or broadcast channel or sidelink control channel).

In some aspects, the S-RSB may include MAC CE carried on PSSCH. For example, the MAC CE may include preferred or non-preferred sidelink resources associated to the S-RSB (e.g., for periodic or semi-persistent or aperiodic or event triggered beam measurement report), sidelink beam association or correspondence or spatial relationship information associated to the S-RSB (e.g., QCL or QCL rooted from the S-RSB for beam measurement report), SBMG configuration information (e.g., one or more SBMG configuration indexes or IDs), or beam measurement and report information (e.g., periodic or semi-persistent or aperiodic or event triggered beam measurement and report, one or more beam measurement configuration indexes or IDs or one or more beam measurement report configuration indexes or IDs) associated with the S-RSB.

In some aspects, the S-RSB may include sidelink common control indication carried on PSSCH (with or without a destination ID in SCI for a broadcast) (e.g., a broadcast control message on a sidelink common control channel or broadcast channel). For example, the sidelink common control indication may include beam association or correspondence or spatial relationship information associated to the S-RSB (e.g., QCL or QCL rooted from the S-RSB for periodic or semi-persistent beam measurement report or aperiodic or event triggered beam measurement report within a time window), SBMG configuration information (e.g., one or more SBMG configuration indexes or IDs), beam measurement and report information (e.g., periodic or semi-persistent beam measurement and report, aperiodic or event triggered beam measurement and report within a time window, one or more beam measurement configuration indexes or IDs or one or more beam measurement report configuration indexes or IDs, or the like) associated with the S-RSB for UEs in the proximity. In some aspects, the sidelink common control may include PSBCH. Depending on the SBMG configuration (e.g., shared or not shared among UEs in proximity), the MAC CE may be on a broadcast or groupcast PSSCH (with or without a destination ID in SCI for a broadcast or groupcast) in some aspects (e.g., shared with other UEs in proximity or before unicast connection or PC5 RRC connection establishment), or the MAC CE may be on a unicast PSSCH in other aspects (e.g., between paired UEs after establishing a unicast connection or PC5 RRC connection via a pair of source ID and destination ID or PC5 link ID in SCI).

In some aspects, the S-RSB may include sidelink common control indication carried on PSSCH (with or without a destination ID in SCI for a broadcast) (e.g., a broadcast control message on a sidelink common control channel or broadcast channel). For example, the sidelink common control indication may include beam association or correspondence or spatial relationship information associated to the S-RSB (e.g., QCL or QCL rooted from the S-RSB for periodic or semi-persistent beam measurement report, or aperiodic or event triggered beam measurement report within a time window), SBMG configuration information (e.g., one or more SBMG configuration indexes or IDs), beam measurement and report information (e.g., periodic or semi-persistent beam measurement and report, one or more beam measurement configuration indexes or IDs or one or more beam measurement report configuration indexes or IDs) associated with the S-RSB for UEs in the proximity or for UEs having not established unicast connection or PC5 RRC connection yet. In some aspects, the sidelink common control may include PSBCH.

In some aspects, the S-RSB may include sidelink control indication carried on PSSCH (with a pair of source ID and destination ID or a PC5 link ID in SCI) (e.g., a unicast control message on a sidelink control channel). For example, the sidelink control indication may include beam association or correspondence or spatial relationship information associated to the S-RSB (e.g., QCL or QCL rooted from the S-RSB for periodic or semi-persistent beam measurement report, or aperiodic or event triggered beam measurement report within a time window), SBMG configuration information (e.g., one or more SBMG configuration indexes or IDs), beam measurement and report information (e.g., periodic, semi-persistent, aperiodic, or event triggered beam measurement and report within a time window, one or more beam measurement configuration indexes or IDs or one or more beam measurement report configuration indexes or IDs, or the like) associated with the S-RSB for UEs during or after establishing a unicast connection or a PC5 RRC connection. In some aspects, the sidelink control indication may include a PC5 RRC message.

In some aspects, the S-RSB sweeping for beam measurement and report may be narrow band or subband with S-RSB spanning more than 3 symbols (e.g., S-RSB 804). In some aspects, the S-RSB sweeping for beam measurement and report may be wide band with S-RSB spanning over 3 symbols (e.g., S-RSB 802) or more than 3 symbols (e.g., S-RSB 804).

As indicated above, FIG. 8 is provided as an example. Other examples may differ from what is described with respect to FIG. 8.

Figure 9:
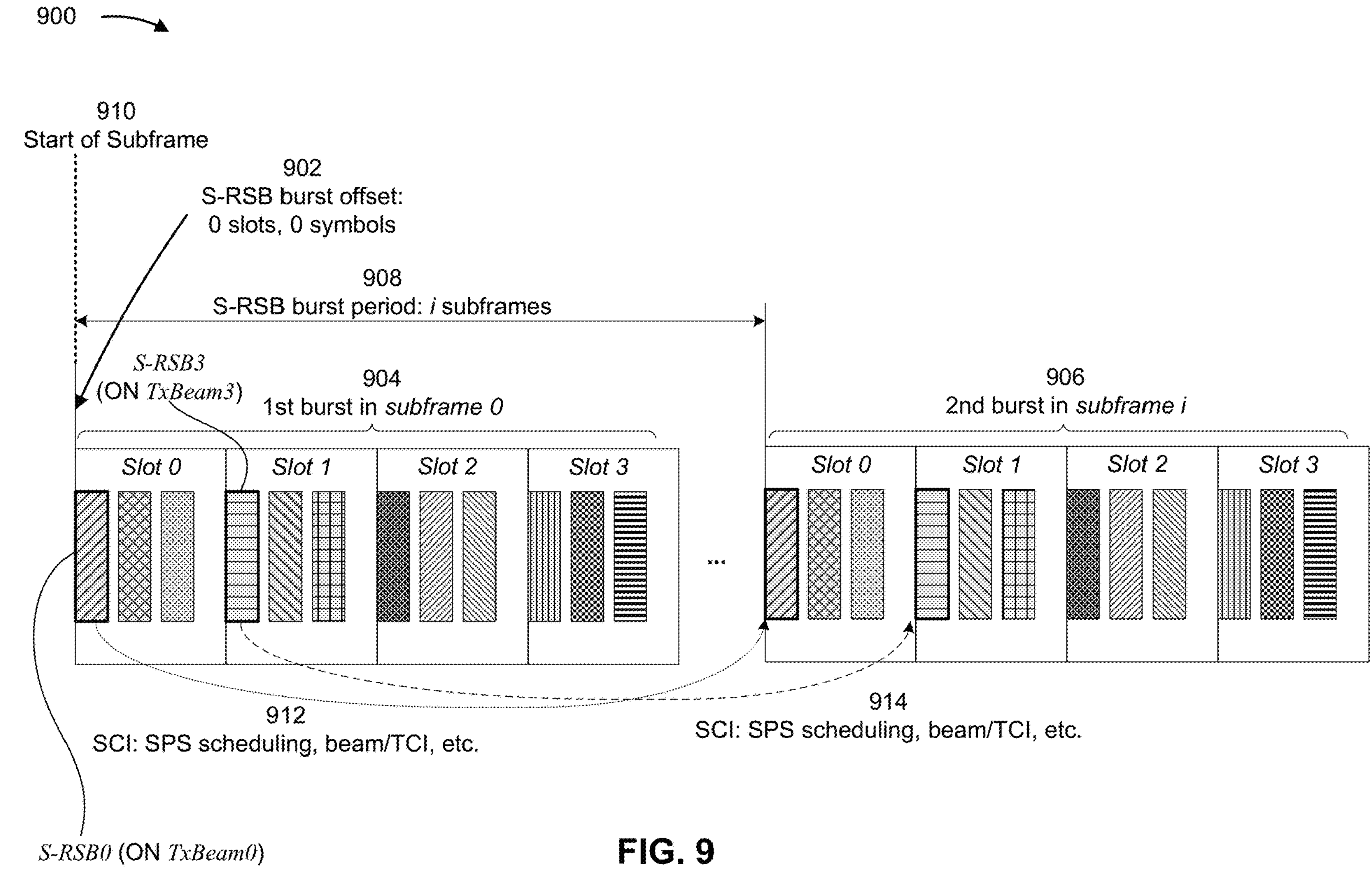
FIG. 9 is a diagram illustrating an example of S-RSB bursts, in accordance with the present disclosure.

FIG. 9 is a diagram illustrating an example 900 of S-RSB bursts, in accordance with the present disclosure.

In some cases, a UE may transmit a long S-RSB burst with multiple S-RSB transmissions on multiple respective beams of a beam sweeping pattern. The beam sweeping pattern may include a wide range of beam directions. The S-RSB burst for beamforming may be specified, preconfigured, or configured (e.g., via system information, such as via a system information block (SIB) such as SIB12 or SIB x or common or broadcast RRC message) so that all UEs supporting FR2 for sidelink communications may acquire such information for initial beamforming or pairing on sidelink. The information may include, for example, a burst offset shown by reference number 902, a burst offset in a slot also shown by reference number 902, a burst duration shown by reference numbers 904 (with respect to a first burst) and reference number 906 (with respect to a second burst), a burst period shown by reference number 908, a quantity of repeated S-RSBs per burst (e.g., twelve in the depicted example), and/or an S-RSB interval (e.g., two symbols without SCI, two symbols with one-symbol SCI interleaved within the RS using a comb structure, three symbols when using the one-symbol SCI S-RSB 802, or four symbols when using the two-symbol SCI S-RSB 804).

Example 900 shows beamforming with the burst offset of 0 slots (e.g., starting from the first slot of a subframe, as shown by reference number 910) and a burst offset in the slot of 0 symbols (e.g., starting from the first symbol of a slot), the burst duration of four slots, the burst period of i subframes or i ms in time, twelve S-RSBs per burst (e.g., three S-RSBs in each symbol of the S-RSB burst as an example), and the S-RSB interval of three symbols (e.g., using three-symbol S-RSB 802 as an example). The burst duration may be long with a wide Tx beam sweeping angular range for beamforming or beam pairing. For example, the burst duration of an S-RSB burst for beamforming may include twelve S-RSBs over four slots, with three S-RSBs in a slot, as shown in FIG. 9. In a sidelink BWP with an FR2 numerology of 60 kHz subcarrier spacing (SCS), there may be four slots per subframe. Each S-RSB of the S-RSB burst is transmitted in a Tx beam and thus the beam sweeping pattern in example 900 includes twelve beams in a 360-degree pattern. For example, a first S-RSB (sometimes indexed as S-RSB0) may be transmitted in one beam direction (e.g., using a first Tx beam, sometimes indexed as TxBeam0), a fourth S-RSB (sometimes indexed as S-RSB3) may be transmitted in another beam direction (e.g., using another Tx beam, sometimes indexed as TxBeam3) that is the fourth beam in the beam sweeping pattern, and so forth. The S-RSB burst duration in example 900 may be four slots, one subframe, or one ms with twelve three-symbol S-RSBs. In some aspects, the S-RSB burst duration in example 900 may be shorter with fewer S-RSB transmissions (e.g., beam fine tuning or beam measurements with active beams or candidate beams based on preconfiguration or configuration) or with short S-RSB interval (e.g., containing only RS signal without SCI in each S-RSB based on preconfiguration or configuration for S-RSB burst patterns or resource allocations) or different S-RSB intervals (e.g., the first S-RSB transmission of a S-RSB burst may contain an SCI on PSCCH, SCI 2, MAC CE on PSSCH, or the like, as described above in connection with FIG. 8, and/or the other S-RSB transmissions of the S-RSB burst may contain only an RS for beam pairing, beam fine tuning, or beam measurement, based on preconfiguration or configuration for S-RSB burst patterns or resource allocations).

The S-RSB burst period (as shown by reference number 908) may be a quantity of i subframes or a time duration of i ms, which may be used for semi-persistent scheduling based resource reservation as indicated in the SCI. As shown by reference number 912, the SCI of S-RSB0 in the first burst may indicate the S-RSB0 transmission in the second burst at the resource reserved with a field of the SCI (e.g., the Resource Reservation Period field) set with the S-RSB burst period. Similarly, as shown by reference number 914, the SCI of S-RSB3 in the first burst may indicate the S-RSB3 transmission in the second burst at the resource reserved with a field of the SCI (e.g., the Resource Reservation Period field) set with the S-RSB burst period.

A UE may transmit the one or more S-RSB bursts in a sidelink resource pool. The sidelink resource pool may be for sidelink beam management or sidelink beam measurement and report. The sidelink resource pool may be dedicated for S-RSB bursts for sidelink beam management or sidelink beam measurement and report shared among UEs in proximity or dedicated to a pair of UEs for a unicast or PC5 RRC connection. The sidelink resource pool for S-RSB bursts may be frequency division multiplexed (FDMed) or time division multiplexed (TDMed) with other transmission and/or reception pools. In some cases, UEs may use one or more S-RSBs and/or one or more S-RSB bursts in connection with operations associated with sensing-based beam sweeping. For example, UEs may use one or more S-RSBs and/or one or more S-RSB bursts in connection with beam discovery via sensing-based S-RSB beam sweeping, similar to one or more of the beam sweeping procedures described above in connection with FIG. 6. Additionally, or alternatively, UEs may use one or more S-RSBs and/or one or more S-RSB bursts in connection with performing sidelink communications based at least in part on beam discovery, such as for purposes of communicating a discovery message, for communicating a direct communication request message, or for communicating a similar message.

Some techniques and apparatuses described herein enable efficient beam sweeping for beam measurement on sidelink, such as for purposes of ensuring reliable beam pair links with beam maintenance or fast recovery from beam failure. In some aspects, a Tx UE may transmit, and one or more Rx UEs may receive, one or more S-RSB bursts in an SBMG based at least in part on one or more SBMG configurations. The one or more Rx UEs may transmit, and the Tx UE may receive, one or more beam reports or beam measurement reports based at least in part on the one or more S-RSB bursts and the one or more SBMG configurations. By utilizing the S-RSB bursts and/or an SBMG for transmitting the one or more S-RSB bursts, multiple Rx UEs may receive S-RSBs at the same time, reducing an amount of RS transmissions by a Tx UE and thus leading to reduced latency associated with beam management communications, increased throughput associated with sidelink communications, and/or more reliable communication channels between paired UEs. Moreover, by utilizing the S-RSB bursts and/or an SBMG for transmitting the one or more S-RSB bursts, robust communication channels and/or BPLs may be formed between a Tx UE and one or more Rx UEs, resulting in reduced power, computing, and network resource consumption otherwise used to correct communication errors associated with sidelink communications, and thus increasing efficient usage of network resources associated with sidelink communications.

As indicated above, FIG. 9 is provided as an example. Other examples may differ from what is described with respect to FIG. 9.

Figure 10:
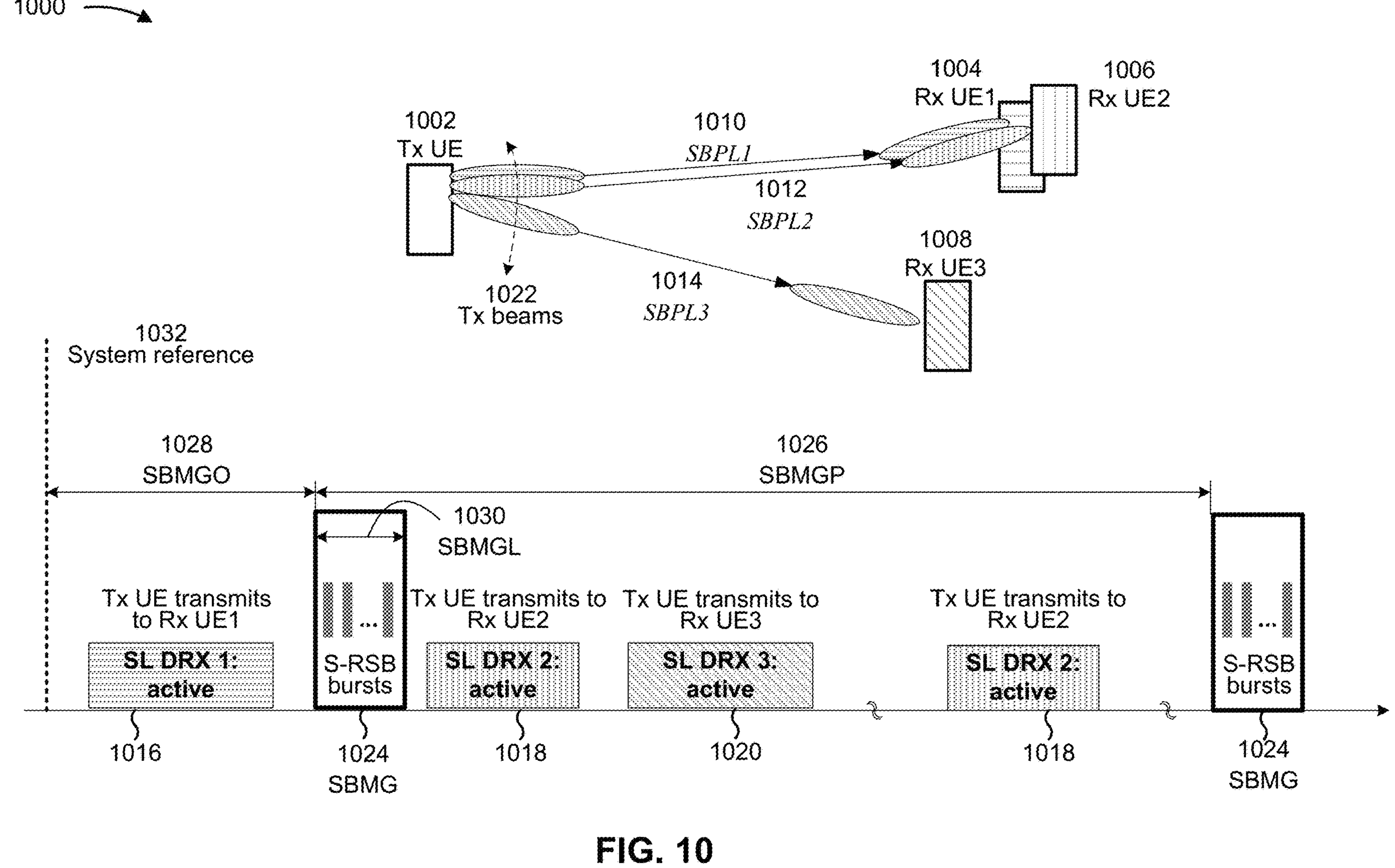
FIG. 10 is a diagram illustrating an example associated with a sidelink beam measurement gap, in accordance with the present disclosure.

FIG. 10 is a diagram illustrating an example 1000 associated with a sidelink beam measurement gap, in accordance with the present disclosure. As shown in FIG. 10, example 1000 includes communication between a Tx UE 1002 and multiple Rx UEs, including Rx UE1 1004, Rx UE2 1006, and Rx UE3 1008. The Tx UE 1002, the Rx UE1 1004, the Rx UE2 1006, and/or the Rx UE3 1008 may correspond to any of the UEs described herein, such as UE 120, UE 405-1, UE 405-2, Tx/Rx UE 505, or Rx/Tx UE 510. In some aspects, the Tx UE 1002, the Rx UE1 1004, the Rx UE2 1006, and the Rx UE3 1008 may be included in a wireless network, such as wireless network 100. In some aspects, two or more Rx UEs may be associated with different devices and co-located (e.g., associated with QCLed sidelink beams or sidelink RS, or associated with a same spatial filter or a same spatial relationship index or ID), and/or two or more Rx UEs may be associated with a same physical device (e.g., sharing a physical sidelink BPL) but support different unicast communications for different sidelink services. For example, in the aspect depicted in FIG. 10, the Rx UE1 1004 and the Rx UE2 1006 may be co-located and associated with a same physical device or different physical devices.

The Tx UE 1002 may communicate with the Rx UE1 1004, the Rx UE2 1006, and the Rx UE3 1008 using beamformed communications via respective sidelinks, shown in FIG. 10 as sidelink beam pair links (SBPL). More particularly, the Tx UE 1002 may communicate with the Rx UE1 1004 via a first SBPL (shown as SBPL1 1010), the Tx UE 1002 may communicate with the Rx UE2 1006 via a second SBPL (shown as SBPL2 1012), and the Tx UE 1002 may communicate with the Rx UE3 1004 via a third SBPL (shown as SBPL3 1014). In some aspects, the Tx UE 1002 may communicate with (e.g., transmit data packets to) the Rx UE1 1004, the Rx UE2 1006, and the Rx UE3 1008 during respective active time durations of the respective sidelinks' discontinuous reception (SL DRX) configurations. For example, the Tx UE 1002 may communicate with the Rx UE1 1004 during an SL DRX active time duration associated with the Rx UE1 1004 (e.g., SL DRX 1 active time shown by reference number 1016), the Tx UE 1002 may communicate with the Rx UE2 1006 during an SL DRX active time duration associated with the Rx UE2 1006 (e.g., SL DRX 2 active time shown by reference number 1018), and/or the Tx UE 1002 may communicate with the Rx UE3 1008 during an SL DRX active time duration associated with Rx UE3 1008 (e.g., SL DRX 3 active time shown by reference number 1020).

In some aspects, the Tx UE 1002 may sweep Tx beams 1022 with S-RSBs (e.g., one of the S-RSBs described above in connection with FIG. 8) in one or more S-RSB bursts (e.g., one or more of the S-RSB bursts described above in connection with FIG. 9) to the Rx UE1 1004, the Rx UE2 1006, and/or the Rx UE3 1008. In some aspects, the Tx UE 1002 may sweep the Tx beams 1022 in an SBMG 1024 with same or different S-RSB bursts. As shown in FIG. 10, the SBMG 1024 may be configured such that the SBMG 1024 occurs between the SL DRX active time durations associated with the Rx UE1 1004, the Rx UE2 1006, and/or the Rx UE3 1008. In this way, the S-RSB bursts may be transmitted at a time in which the S-RSBs may be shared by Rx UE1 1004, the Rx UE2 1006, and/or the Rx UE3 1008 with reduced S-RSB burst overhead and cause minimal interference with data transmissions to the Rx UE1 1004, the Rx UE2 1006, and/or the Rx UE3 1008. Additionally, or alternatively, the SBMG 1024 may be configured such that the SBMG 1024 occurs during the SL DRX active time durations associated with one or more Rx UEs. In this way, the one or more Rx UEs do not need to wake up for monitoring S-RSB bursts while at the sidelink DRX inactive state, such as for a purpose of saving power associated with monitoring S-RSB bursts while not active with sidelink communications.

In some aspects, the SBMG may be configured with multiple parameters, such as an SBMG period (SBMGP) 1026, an SBMG offset (SBMGO) 1028, and/or an SBMG length (SBMGL) 1030. The SBMGP 1026 may correspond to a period of time (e.g., with absolution time in ms, or a number of slots, subframes, or radio frames) between successive reoccurring SBMGs 1024. The SBMGO 1028 may correspond to an offset in time (e.g., with absolution time in ms, or a number of symbols or slots or subframes or radio frames) between a system reference 1032 and a start of a first instance of the SBMG 1024, of multiple reoccurring SBMGs 1024. And the SBMGL 1030 may correspond to a length (e.g., with absolution time in ms, or a number of symbols or slots or subframes or radio frames) of the SBMG 1024. In some aspects, the system reference 1032 may be associated with a direct frame number (DFN) associated with the sidelink. In some aspects, the DFN may be mapped to a system frame number (SFN) based on the system information (e.g., SIB 12 or SIBx) or configuration from a base station or CU. For example, in some aspects, the SBMG 1024 may start in (e.g., a first instance of the SBMG 1024 may be included in) a radio frame associated with a DFN that satisfies the criterion $$DFN \bmod \left\lfloor \frac{SBMGO}{10} \right\rfloor = \left\lfloor \frac{SBMGO}{10} \right\rfloor,$$

and a subframe of the radio frame in which an index of the subframe is equal to the expression SBMGO mod 10 (e.g., the SBMG starts at the subframe 2 of radio frame 1 within the DFN range), where the SBMGO is in subframe. For another example, in some aspects, the SBMG 1024 may start in (e.g., a first instance of the SBMG 1024 may be included in) a subframe associated with a DFN that satisfies the criterion DFN mod SBMGO=SBMGO, in which an index of the subframe satisfies the expression (e.g., the SBMG starts at the subframe of DFN 16 within the DFN range), where the SBMGO is in subframe.

Although in the example depicted in FIG. 10 a same SBMG 1024 is configured for the various Rx UEs (e.g., the Rx UE1 1004, the Rx UE2 1006, and the Rx UE3 1008), aspects of the disclosure are not so limited. In some other aspects, multiple SBMGs may be configured for and/or associated with different Rx UEs, as described in more detail below in connection with FIG. 11.

As indicated above, FIG. 10 is provided as an example. Other examples may differ from what is described with respect to FIG. 10.

Figure 11:
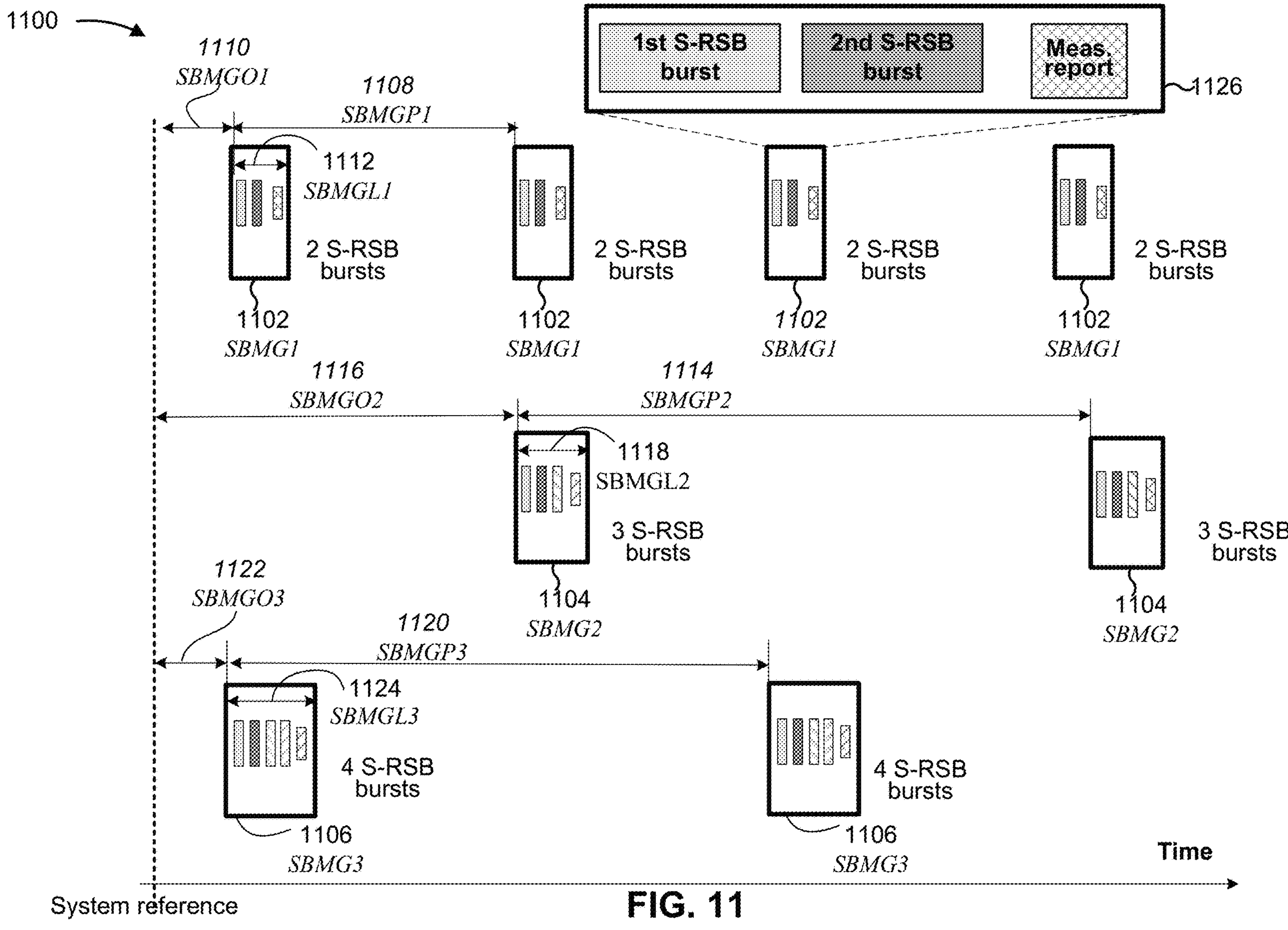
FIG. 11 is a diagram illustrating an example associated with multiple sidelink beam measurement gaps, in accordance with the present disclosure.

FIG. 11 is a diagram illustrating an example 1100 associated with multiple sidelink beam measurement gaps, in accordance with the present disclosure.

In the example shown in FIG. 11, different SBMGs may be configured for all Rx UEs with different beam management procedures or beam measurement and report tasks or objects, or for different Rx UEs with different beam management procedures or beam measurement and report tasks or objects. For example, three different SBMGs, shown as SBMG1 1102, SBMG2 1104, and SBMG3 1106 in FIG. 11, may be configured for three or more Rx UEs, such as the Rx UE1 1004, the Rx UE2 1006, and the Rx UE3 1008 described above in connection with FIG. 10, or similar Rx UEs. Moreover, in a similar manner as described above in connection with the SBMG 1024 of FIG. 10, each of the SBMG1 1102, the SBMG2 1104, and the SBMG3 1106 may be configured with a number of parameters, such as an SBMGP, an SBMGO, and/or an SBMGL. For example, the SBMG1 1102 may be configured with a first SBMGP, shown as SBMGP1 1108, a first SBMGO, shown as SBMGO1 1110, and a first SBMGL, shown as SBMGL1 1112. Similarly, the SBMG2 1104 may be configured with a second SBMGP, shown as SBMGP2 1114, a second SBMGO, shown as SBMGO2 1116, and a second SBMGL, shown as SBMGL2 1118, and the SBMG3 1106 may be configured with a third SBMGP, shown as SBMGP3 1120, a third SBMGO, shown as SBMGO3 1122, and a third SBMGL, shown as SBMGL3 1124.

In some aspects, two or more of the SBMGs may be associated with different numbers of S-RSB bursts and/or may be configured for a different purpose with same or different Rx UEs. More particularly, as shown by reference number 1126, the SBMG1 1102 may be associated with two S-RSB bursts (e.g., a quick Tx or Rx beam fine tuning or beam maintenance measurement and report, for example, for all Rx UEs), such that each instance of the SBMG1 1102 includes resources associated with a first S-RSB burst, a second S-RSB burst, and a beam measurement report (e.g., a report used to transmit, by one of the Rx UEs to a Tx UE, measurements or similar information associated with the S-RSB bursts). In contrast, the SBMG2 1104 may be associated with three S-RSB bursts (e.g., such that each instance of the SBMG2 1104 includes resources associated with a first S-RSB burst for a first Rx UE, a second S-RSB burst for a second Rx UE, a third S-RSB burst for a third Rx UE, for example, for a specific Tx or Rx beam fine tuning or a specific beam measurement and report and a beam measurement report for each Rx UE), and/or the SBMG3 1106 may be associated with four S-RSB bursts (e.g., such that each instance of the SBMG3 1106 includes resources associated with a first S-RSB burst, a second S-RSB burst, a third S-RSB burst, a fourth S-RSB burst, for example, for initial beam forming for candidate beam selection and associated beam measurement and report for all Rx UEs). In some aspects, each SBMG may be specifically for an Rx UE. For example, the SBMG1 1102 with two S-RSB bursts may be used for purposes of a first Rx UE (e.g., Rx UE1 1004) to fine tune Tx and/or Rx beams, the SBMG2 1104 with three S-RSB bursts may be used for purposes of a second Rx UE (e.g., Rx UE2 1006) to monitor serving and candidate beams, and the SBMG3 1106 with four S-RSB bursts may be used for purposes of a third Rx UE (e.g., Rx UE3 1008) to update its monitoring beam list.

In some aspects, one or more of the SBMGs (e.g., the SBMG1 1102, the SBMG2 1104, the SBMG3 1106, or a similar SBMG) may be configured by a Tx UE (e.g., the Tx UE 1002). For example, the Tx UE may determine and/or configure an SBMG configuration for a given Rx UE based at least in part on the Rx UE's serving beam and/or candidate beam list (e.g., determining the length of an SBMG (SBMGL) with a S-RSB sweeping duration or number of S-RSB bursts); the Rx UE's SL DRX configuration (e.g., determining the start point of an SBMG (SBMGO) for the alignment with the SL DRX, for example, within or outside of the SL DRX active time); the Rx UE's status, such as a location of the Rx UE and/or a velocity of the Rx UE or an orientation of the Rx UE (e.g., determining the period of an SBMG (SBMGP) if an Rx UE is moving closer or away from the Tx UE or if the Rx UE has rotated); the Rx UE's device ID and/or Layer 2 fingerprint (e.g., determining if two Rx UEs are collocated on different devices or on a same device); or similar information. A locally unique Layer 2 fingerprint may be generated by the UE MAC entity based on the device ID with reduced bits comparing with the device ID (e.g., truncated from the device ID, randomized with the device ID, or hashed with the device ID), where a same Layer 2 fingerprint may be generated from a same device ID. Additionally, or alternatively, the Tx UE may configure SBMG configurations for multiple Rx UEs in order to reduce a sidelink beam sweeping cost, or the like. For example, the Tx UE may configure SBMG configurations such that multiple Rx UEs may share all or a subset of S-RSB bursts. For example, the Tx UE may configure SBMG configurations such that a first Rx UE (e.g., Rx UE1 1004), a second Rx UE (e.g., Rx UE2 1006), and a third Rx UE (e.g., Rx UE3 1008) share the first and second S-RSB bursts (e.g., the S-RSB bursts associated with the SBMG1 1102 and the S-RSB bursts associated with the SBMG2 1104), and/or such that the second Rx UE and the third Rx UE share the third S-RSB bursts (e.g., the S-RSB bursts associated with the SBMG3 1106). Each Rx UE may conduct sidelink beam measurements with the S-RSB bursts and/or report sidelink beam measurements after the S-RSB bursts based at least in part on the corresponding SBMG configuration and beam measurement configuration and beam report configuration.

Additionally, or alternatively, if multiple Rx UEs are co-located and/or associated with the same device (e.g., share the same device ID and/or Layer 2 fingerprint, as described above in connection with the Rx UE1 1004 and the Rx UE2 1006), if multiple Rx UEs share the same or similar beam list, if multiple Rx UEs share the same or similar status (e.g., the same or similar location and/or the same or similar velocity), or if multiple Rx UEs share other similar features, the Tx UE may determine and/or configure one SBMG configuration for the multiple Rx UEs. For example, returning to the case described in connection with FIG. 10 in which the Rx UE1 1004 and the Rx UE2 1006 are co-located and/or associated with a same physical device, a Tx UE (e.g., the Tx UE 1002) may determine and/or configure one SBMG configuration applicable to both Rx UEs, which is described in more detail below in connection with FIGS. 12 and 13. This may eliminate redundant configurations and/or signaling of redundant configurations, and/or redundant beam measurement reports, thereby reducing power, computing, and network consumption by the Tx UE and/or one or more Rx UEs.

As indicated above, FIG. 11 is provided as an example. Other examples may differ from what is described with respect to FIG. 11.

Figure 12:
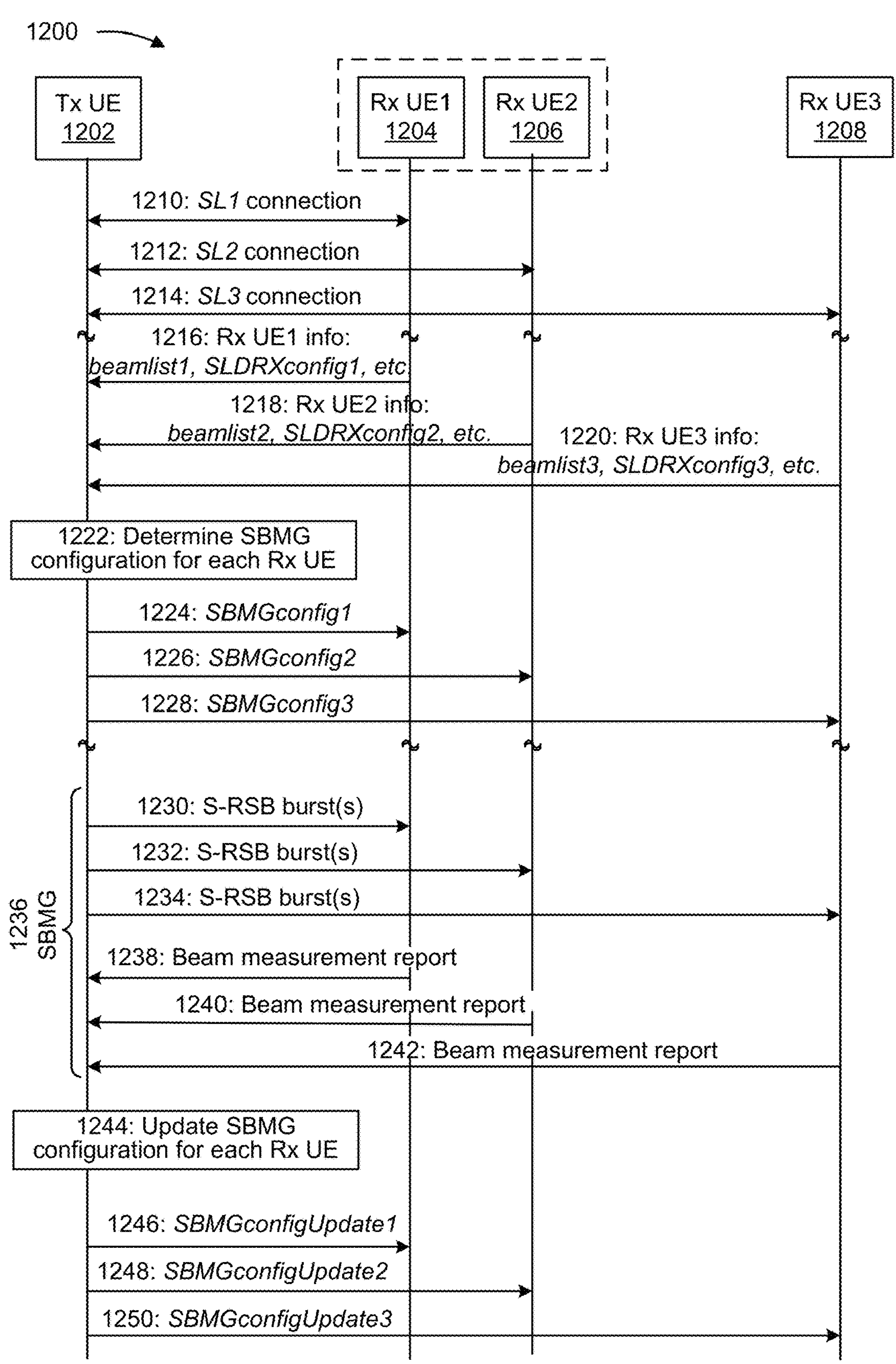
FIG. 12 is a diagram of an example associated with configuring and activating sidelink beam measurement gap configurations, in accordance with the present disclosure.

FIG. 12 is a diagram of an example 1200 associated with configuring and activating sidelink beam measurement gap configurations, in accordance with the present disclosure. As shown in FIG. 12, a Tx UE 1202 (e.g., Tx UE 1002 or a similar UE, such as UE 120, first UE 405-1, second UE 405-2, or Tx/Rx UE 505) may communicate with one or more Rx UEs (e.g., Rx UE1 1004, Rx UE2 1006, Rx UE3 1008, or similar UEs, such as one or more of UE 120, first UE 405-1, second UE 405-2, or Rx/Tx UE 510), including Rx UE1 1204, Rx UE2 1206, and Rx UE3 1208. In some aspects, the Tx UE 1202, the Rx UE1 1204, the Rx UE2 1206, and the Rx UE3 1208 may be included in a wireless network (e.g., wireless network 100). In some aspects, the Rx UE1 1204 and the Rx UE2 1206 may be co-located (e.g., associated with QCLed sidelink beams or sidelink RS's, or associated with a same spatial filter or spatial relationship) and/or associated with a same physical device (e.g., associated with a same physical sidelink beam pair link and/or device ID), similar to the Rx UE1 1004 and the Rx UE2 1006 described above in connection with FIG. 10.

As shown by reference numbers 1210, 1212, and 1214, the Tx UE 1202 may establish a sidelink beam connection (e.g., beam pair link before or during the PC5 RRC connection and/or a sidelink unicast connection) with the Rx UE1 1204, the Rx UE2 1206, and/or the Rx UE3 1208. More particularly, as indicated by reference number 1210, the Tx UE 1202 may establish a first sidelink beam connection (shown as SL1, and sometimes referred to as PC5Connection1) with the Rx UE1 1204; as indicated by reference number 1212, the Tx UE 1202 may establish a second sidelink beam connection (shown as SL2, and sometimes referred to as PC5Connection2) with the Rx UE2 1206; and/or as indicated by reference number 1214, the Tx UE 1202 may establish a third sidelink beam connection (shown as SL3, and sometimes referred to as PC5Connection3) with the Rx UE3 1208. Put another way, the SL1 connection shown by reference number 1210 (e.g., PC5Connection1) may be established for purposes of unicast transmissions between the Tx UE 1202 and the Rx UE1 1204 with paired beams or active beams. The SL2 connection shown by reference number 1212 (e.g., PC5Connection2) may be established for purposes of unicast transmissions between the Tx UE 1202 and the Rx UE2 1206 with paired beams or active beams. The SL3 connection shown by reference number 1214 (e.g., PC5Connection3) may be established for purposes of unicast transmissions between the Tx UE 1202 and the Rx UE3 1208 with paired beams or active beams.

As shown by reference numbers 1216, 1218, and 1220, the Rx UE1 1204, the Rx UE2 1206, and/or the Rx UE3 1208 may transmit, and the Tx UE 1202 may receive, a corresponding PC5 RRC message or similar message indicating UE capability information or UE information associated with the corresponding Rx UE (sometimes referred to as UEAssistanceInformationSidelink). In some aspects, the UE capability information may indicate, for each Rx UE, at least a UE capability for supporting beam management (e.g., a number of beams, a number of panels, a timeline for switching beams, a timeline for measuring and/or reporting beams, or the like). In some aspects, the UE information may indicate, for each Rx UE, at least one of a monitoring beam list including one or more serving beams (e.g., associated with one or more antennas or panels) and one or more candidate beams (e.g., associated with one or more antennas or panels) associated with a corresponding Rx UE (sometimes referred to as beamlist), an SL DRX configuration associated with the corresponding Rx UE (sometimes referred to as SLDRXconfig), a location and/or orientation associated with the corresponding Rx UE (sometimes referred to as location), a velocity associated with the corresponding Rx UE (sometimes referred to as velocity), a device ID associated with the corresponding Rx UE (sometimes referred to as deviceID), or a Layer 2 fingerprint associated with the corresponding Rx UE (sometimes referred to as L2FP), among other UE information.

As shown by reference number 1222, the Tx UE 1202 may determine one or more beam management configurations including SBMG configurations associated with each of the Rx UE1 1204, the Rx UE2 1206, and the Rx UE3 1208. In some aspects, the Tx UE 1202 may determine the one or more beam management configurations including SBMG configurations based at least in part on the UE information described above in connection with reference numbers 1216, 1218, and 1220 (e.g., the corresponding beamlist, SLDRXconfig, location, velocity, deviceID, or similar information). For example, in aspects in which multiple Rx UEs are co-located and/or associated with a same physical device (e.g., the first Rx UE1 1204 and the second Rx UE2 1206), and/or when multiple Rx UEs are associated with a similar status (e.g., a similar location and/or orientation, a similar velocity, or similar parameters), the Tx UE 1202 may determine one SBMG configuration applicable to both Rx UEs, to thereby reduce signaling overhead and/or redundant SBMG configurations and/or beam management reports, which is described in more detail below.

As shown by reference numbers 1224, 1226, and 1228, the Tx UE 1202 may transmit, and the Rx UE1 1204, the Rx UE2 1206, and/or the Rx UE3 1208 may receive, beam management configuration information indicating the one or more SBMG configurations (sometimes referred to as SBMGconfig). For example, as indicated by reference number 1224, the Tx UE 1202 may transmit, and the Rx UE1 1204 may receive, a first beam management configuration with SBMG configuration (shown as SBMGconfig1); as indicated by reference number 1226, the Tx UE 1202 may transmit, and the Rx UE2 1206 may receive, a second beam management configuration with SBMG configuration (shown as SBMGconfig2); and/or as indicated by reference number 1228, the Tx UE 1202 may transmit, and the Rx UE3 1208 may receive, a third beam management configuration with SBMG configuration (shown as SBMGconfig3). In some aspects, the indication of the beam management configuration with one or more SBMG configurations may be transmitted via a PC5 RRC message, such as a PC5 RRC configuration communication. In some other aspects, the indication of the beam management configuration with one or more SBMG configurations may be transmitted via a PC5 MAC-CE message used to activate the SBMG configurations (e.g., SBMGconfig1, SBMGconfig2, and/or SBMGconfig3).

Moreover, based on the Rx UE's information, in aspects in which a first Rx UE (e.g., the Rx UE1 1204) and a second Rx UE (e.g., the Rx UE2 1206) are associated with a same device (e.g., associated with a same deviceID or Layer 2 fingerprint L2FT), a same beam management configuration with SBMG configuration may be associated with the first UE and the second UE (e.g., SBMGconfig1 and SBMGconfig2 may be the same SBMG configuration). Additionally, or alternatively, in aspects in which the same SBMG configuration is associated with two co-located Rx UEs and/or two Rx UEs associated with a same physical device (e.g., the Rx UE1 1204 and the Rx UE2 1206), the Tx UE 1202 may transmit the beam management configuration with SBMG configuration to one or both of the Rx UEs (e.g., the Tx UE 1202 may transmit the beam management configuration with SBMG configuration only to the Rx UE1 1204, only to the Rx UE2 1206, or to both the Rx UE1 1204 and the Rx UE2 1206). Transmitting the beam management configuration with SBMG configuration to only one of the co-located Rx UEs and/or only one of multiple Rx UEs located at a same physical device may reduce signaling overhead associated with transmitting redundant beam management configuration with SBMG configurations.

In some aspects, each SBMG configuration, of the one or more SBMG configurations (e.g., SBMGconfig1, SBMGconfig2, and/or SBMGconfig3), may be associated with at least one of an SBMGP, an SBMGO, or an SBMGL, such as one of the SBMGPs, SBMGOs, or SBMGLs described above in connection with FIGS. 10 and 11. Additionally, or alternatively, in some aspects, at least one of a starting point in a radio frame and a subframe within the radio frame associated with an SBMG associated with each SBMG configuration or a starting point in a DFN associated with the SBMG associated with each SBMG configuration may be associated with an SBMGO with radio frame and subframe of the radio frame or an SBMGO with a DFN. For example, as described above in connection with FIG. 10, the SBMG may start in (e.g., a first instance of the SBMG may be included in) a radio frame associated with a DFN that satisfies the criterion $$DFN \bmod \left\lfloor \frac{SBMGO}{10} \right\rfloor = \left\lfloor \frac{SBMGO}{10} \right\rfloor,$$

and a subframe of the radio frame in which an index of the subframe is equal to the expression SBMGO mod 10, or the SBMG may start in (e.g., a first instance of the SBMG may be included in) a DFN that satisfies the criterion DFN mod SBMGO=SBMGO.

Additionally or alternatively, as shown by reference numbers 1224, 1226, and 1228, the Tx UE 1202 may transmit, and the Rx UE1 1204, the Rx UE2 1206, and/or the Rx UE3 1208 may receive, configuration information indicating the one or more sidelink beam reports (e.g., selected Tx or Rx beam for beam pairing or beam fine tuning or beam switching, or candidate beam(s) for beam failure recovery) or beam measurement (e.g., RSRP, RSRQ, or signal-to-noise-plus-interference ratio (SINR) of one or more S-RSB bursts) configurations (sometimes referred to as SLbeamMeasConfig). For example, the Tx UE 1202 may transmit, and the Rx UE1 1204 may receive, a first sidelink beam report or beam measurement configuration; the Tx UE 1202 may transmit, and the Rx UE2 1206 may receive, a second sidelink beam report or beam measurement configuration; and/or, the Tx UE 1202 may transmit, and the Rx UE3 1208 may receive, a third sidelink beam report or beam measurement configuration. In some aspects, the indication of the one or more sidelink beam report or beam measurement configurations may be transmitted via a PC5 RRC message, such as a PC5 RRC configuration communication. In some other aspects, the indication of the one or more sidelink beam report or beam measurement configurations may be transmitted via a PC5 MAC-CE message used to activate the one or more sidelink beam report or beam measurement configurations.

The one or more sidelink beam report or beam measurement configurations may include type of sidelink beam management (e.g., sidelink beam forming, sidelink Tx or Rx beam fine tuning, sidelink serving beam monitoring or reselection, sidelink candidate beam monitoring or reselection, etc.), type of sidelink beam report or beam measurement (e.g., periodic, semi-persistent, aperiodic triggered by a condition (e.g., a rotation at a UE or an orientation or location change at a UE, or sidelink RSRP threshold SL-RSRP-Thres-Meas) or an event (e.g., indication or request from a UE), beam report tasks or beam measurement objects for one or more sidelink beam management types or one or more sidelink beam report or beam measurement types, one or more S-RSB burst configurations for beam report or beam measurement (e.g., S-RSB burst configuration index or ID associated to an S-RSB configuration or structure (e.g., with or without SCI or PSSCH, two-symbol, three-symbol, or four-symbol S-RSB), and/or an S-RSB burst structure or configuration (e.g., same S-RSB interval for all S-RSB transmissions within an S-RSB burst or different S-RSB intervals for S-RSB transmissions within an S-RSB burst with the first S-RSB transmission containing SCI and other S-RSB transmissions not containing SCI, or any combination)), or the like. Sidelink beam report and/or measurement report may be triggered by comparing the sidelink measurement with a sidelink beam measurement threshold (e.g., above or below a threshold), an indication from an Rx UE via PC5 RRC message (e.g., UE's information on UEAssistanceInformationSidelink) or MAC CE (e.g., activating sidelink beam report and/or measurement report), or an indication from the Tx UE via MAC CE (e.g., activating sidelink beam report and/or measurement report) or SCI (e.g., sidelink beam report and/or measurement request or CSI measurement request in SCI).

Additionally or alternatively, as shown by reference numbers 1224, 1226, and 1228, the Tx UE 1202 may transmit, and the Rx UE1 1204, the Rx UE2 1206, and/or the Rx UE3 1208 may receive, configuration information indicating the one or more sidelink beam report and/or measurement report configurations (sometimes referred to as SLbeamReportConfig). For example, the Tx UE 1202 may transmit, and the Rx UE1 1204 may receive, a first sidelink beam report and/or measurement report configuration; the Tx UE 1202 may transmit, and the Rx UE2 1206 may receive, a second sidelink beam report and/or measurement report configuration; and/or, the Tx UE 1202 may transmit, and the Rx UE3 1208 may receive, a third sidelink beam report and/or measurement report configuration. In some aspects, the indication of the one or more sidelink beam report and/or measurement report configurations may be transmitted via a PC5 RRC message, such as a PC5 RRC configuration communication. In some other aspects, the indication of the one or more sidelink beam report and/or measurement report configurations may be transmitted via a PC5 MAC-CE message used to activate the one or more sidelink beam report and/or measurement report configurations.

The one or more sidelink beam report and/or measurement report configurations may include type of sidelink beam management (e.g., sidelink beam forming, sidelink Tx or Rx beam fine tuning, sidelink serving beam monitoring or reselection, sidelink candidate beam monitoring or reselection, etc.), type of sidelink beam report and/or measurement report (e.g., periodic, semi-persistent, aperiodic triggered by a condition (e.g., a rotation at a UE or an orientation or location change at a UE, or sidelink RSRP threshold SL-RSRP-Thres-Report) or an event (e.g., indication or request from a UE), beam report tasks or beam measurement objects for one or more sidelink beam management types, one or more sidelink beam measurement types, one or more sidelink beam report and/or beam measurement report types (e.g., group based beam reports or individual beam reports), and/or one or more beams and/or resources for one or more sidelink beam reports and/or beam measurement reports (e.g., beam correspondence or spatial relationship and/or resources for beam report and/or beam measurement report associated to each S-RSB of an S-RSB burst configuration index or ID), etc. Sidelink beam report may be triggered by a rotation at a UE or an orientation or location change at a UE, comparing the sidelink measurement with a sidelink beam measurement threshold (e.g., above or below a threshold), an indication from an Rx UE via PC5 RRC message (e.g., UE's assistance information such as UEAssistanceInformationSidelink) or MAC CE (e.g., activating sidelink beam report), or an indication from the Tx UE via MAC CE (e.g., activating sidelink beam report) or SCI (e.g., sidelink beam report request or CSI request in SCI).

Moreover, in aspects in which a first Rx UE (e.g., the Rx UE1 1204) and a second Rx UE (e.g., the Rx UE2 1206) are associated with a same device (e.g., associated with a same deviceID or Layer 2 fingerprint L2FP), a same SBMG configuration, sidelink beam measurement configuration and/or sidelink beam report configuration may be transmitted to both UEs or one of the UEs.

The Rx UE1 1204, the Rx UE2 1206, and/or the Rx UE3 1208 may configure themselves based at least in part on the configuration information (e.g., SBMG configuration, sidelink beam measurement configuration, sidelink beam report and/or sidelink beam measurement configuration). In some aspects, the Rx UE1 1204, the Rx UE2 1206, and/or the Rx UE3 1208 may be configured to perform one or more operations described herein based at least in part on the configuration information.

Moreover, in aspects in which a first Rx UE (e.g., the Rx UE1 1204) and a second Rx UE (e.g., the Rx UE2 1206) are associated with a same device (e.g., associated with a same deviceID or Layer 2 fingerprint L2FP), one or both Rx UE1 1204 and Rx UE2 1206 may be configured to perform one or more operations described herein based at least in part on the configuration information. For example, the Layer 1 (e.g., a PHY entity for Layer 1 report) or Layer 2 (e.g., a MAC entity for Layer 2 report) or Layer 3 (e.g., an RRC entity for Layer 3 report) may determine either Rx UE1 1204 or Rx UE2 1206 may be configured for sidelink beam measurement and/or sidelink beam report based on the device ID deviceID or Layer 2 fingerprint L2FP).

As indicated by reference numbers 1230, 1232, and 1234, within a sidelink resource pool preconfigured or configured for sidelink beam measurement and/or sidelink beam report, the Tx UE 1202 may transmit after sensing and selecting resources within the sidelink resource set associated with one or more sidelink beam measurement and/or sidelink beam report as preconfigured or configured by RRC, activated by MAC CE, or indicated by MAC CE or SCI as described with details in FIG. 8, and the Rx UE1 1204, the Rx UE2 1206, and/or the Rx UE3 1208 may receive, one or more S-RSB bursts, such as one or more of the S-RSB bursts in the resource pool for sidelink beam measurement gap described above in connection with FIGS. 10 and 11. More particularly, in some aspects, the Tx UE 1202 may transmit, and the Rx UE1 1204, the Rx UE2 1206, and/or the Rx UE3 1208 may receive, one or more S-RSB bursts in an SBMG 1236 based at least in part on the one or more SBMG configurations (e.g., SBMGconfig1, SBMGconfig2, and/or SBMGconfig3) and/or one or more sidelink beam measurement configurations and/or one or more sidelink beam report configurations. Transmitting the one or more S-RSB bursts in the SBMG 1236 may beneficially reduce latency associated with beamforming operations, because more than one Rx UE may simultaneously receive the S-RSB bursts, reducing an amount of S-RSB transmissions from the Tx UE 1202 to the Rx UE1 1204, the Rx UE2 1206, and/or the Rx UE3 1208.

As indicated by reference numbers 1238, 1240, and 1242 in the SBMG 1236, within a sidelink resource pool preconfigured or configured for sidelink beam measurement and/or sidelink beam report, in some aspects, the Rx UE1 1204, the Rx UE2 1206, and/or the Rx UE3 1208 may transmit after sensing and selecting resources within the sidelink resource set associated with one or more sidelink beam measurement and/or sidelink beam report as preconfigured or configured by RRC, activated by MAC CE, or indicated by MAC CE or SCI as described with details in FIG. 8, and the Tx UE 1202 may receive, one or more beam measurement reports and/or sidelink beam reports (sometimes referred to as SL-RSRP-report) based at least in part on the one or more report tasks or objects associated to one or more measurement tasks or objects with one or more S-RSB bursts within the one or more SBMG configurations (e.g., SBMGconfig1, SBMGconfig2, and/or SBMGconfig3). More particularly, the Rx UE1 1204 may transmit, and the Tx UE 1202 may receive, a first beam measurement report (sometimes referred to as SL-RSRP-report1) and/or sidelink beam report; the Rx UE2 1206 may transmit, and the Tx UE 1202 may receive, a second beam measurement report (sometimes referred to as SL-RSRP-report2) and/or sidelink beam report; and/or the Rx UE3 1208 may transmit, and the Tx UE 1202 may receive, a third beam measurement report (sometimes referred to as SL-RSRP-report3) and/or sidelink beam report. In some aspects, a beam measurement report transmitted by an Rx UE may be associated with a Layer 3 sidelink RSRP measurement report (sometimes referred to as an L3 SL-RSRP report), which may be transmitted via a PC5 RRC message or a similar communication. In some other aspects, a beam measurement report transmitted by an Rx UE may be associated with a Layer 2 sidelink RSRP measurement report (sometimes referred to as an L2 SL-RSRP report), which may be transmitted via a MAC-CE message or a similar communication. In some other aspects, a beam measurement report transmitted by an Rx UE may be associated with a Layer 1 sidelink RSRP measurement report (sometimes referred to as an L1 SL-RSRP report), which may be transmitted via a multi-bit PSFCH message or SCI 2, MAC CE with PSSCH, or a similar communication. In some aspects, a beam report transmitted by an Rx UE may be transmitted using the transmit beam associated with the selected beam (e.g., for beam pairing or fine tuning) or the active transmit beam (e.g., for beam fine tuning, beam switching, or beam failure recovery) via a 1-bit PSFCH indicating a beam at a PSFCH occasion or PSFCH symbol associated with the transmit beam (e.g., selected beam or active beam). In some other aspects, a beam report transmitted by an Rx UE may be transmitted using the active transmit beam via a multi-bit PSFCH, SCI 2, or MAC CE indicating multiple beams (e.g., candidate beams) at a PSFCH occasion or resource associated with beam report. Moreover, in aspects in which the same SBMG configuration is associated with two co-located Rx UEs and/or two Rx UEs associated with a same physical device (e.g., the Rx UE1 1204 and the Rx UE2 1206), the Tx UE 1202 may receive a single beam measurement report associated with both Rx UEs. For example, in aspects in which the Tx UE 1202 transmits a single SBMG configuration, that is associated with both the Rx UE1 1204 and the Rx UE2 1206, to only one of the Rx UE1 1204 or the Rx UE2 1206, the Tx UE 1202 may receive a single beam measurement report, associated with both the Rx UE1 1204 and the Rx UE2 1206, from the Rx UE to which the SBMG configuration was transmitted. This may reduce signaling overhead and resource consumption otherwise associated with transmitting and receiving redundant beam measurement reports.

As shown by reference number 1244, in some aspects, the Tx UE 1202 may determine to update one or more SBMG configurations, sidelink beam measurement configurations, and/or sidelink beam report configurations. For example, in some aspects, the Tx UE 1202 may determine to update one or more SBMG configurations based at least in part on one or more beam reports or beam measurement reports received in connection with messages described in connection with reference numbers 1238, 1240, and 1242. For example, in some aspects, the Tx UE 1202 may determine to update one or more SBMG configurations based at least in part on one or more updated beam measurement configurations or one or more updated beam report configurations. For example, in some aspects, the Tx UE 1202 may determine to update one or more SBMG configurations, sidelink beam measurement configurations, and/or sidelink beam report configurations based at least in part on one or more UE assistance information messages (e.g., updated SL DRX configuration, beam list, etc.) received in connection with messages described in connection with reference numbers 1216, 1218, and 1220. For example, in some aspects, the Tx UE 1202 may determine to update one or more SBMG configurations, sidelink beam measurement configurations, and/or sidelink beam report configurations based at least in part on one or more added or released sidelink connections (e.g., PC5 RRC connections established or release by the Tx UE) described in connection with reference numbers 1210, 1212, and 1214.

In such aspects, and as shown by reference numbers 1246, 1248, and 1250, the Tx UE 1202 may transmit, and the Rx UE1 1204, the Rx UE2 1206, and/or the Rx UE3 1208 may receive, updated configuration information indicating one or more updated SBMG configurations (sometimes referred to as SBMGconfigUpdate), sidelink beam measurement configurations and/or sidelink beam report configurations based at least in part on the one or more beam reports or beam measurement reports or one or more updated beam measurement configurations or one or more updated beam report configurations or one or more added or released sidelink connections. More particularly, the Tx UE 1202 may transmit, and the Rx UE1 1204 may receive, an indication of a first updated SBMG configuration (sometimes referred to as SBMGconfigUpdate1) and/or a first updated sidelink beam measurement configurations and/or a first updated sidelink beam report configurations; the Tx UE 1202 may transmit, and the Rx UE2 1206 may receive, an indication of a second updated SBMG configuration (sometimes referred to as SBMGconfigUpdate2) and/or a second updated sidelink beam measurement configurations and/or a second updated sidelink beam report configurations; and/or the Tx UE 1202 may transmit, and the Rx UE3 1204 may receive, an indication of a third updated SBMG configuration (sometimes referred to as SBMGconfigUpdate3) and/or a third updated sidelink beam measurement configurations and/or a third updated sidelink beam report configurations. In some aspects, the indication of the one or more updated SBMG configurations and/or updated sidelink beam measurement configurations and/or updated sidelink beam report configurations may be transmitted via a PC5 RRC message, such as a PC5 RRC reconfiguration communication (sometimes referred to as an RRCReconfigurationSidelink message). In some other aspects, the indication of the one or more updated SBMG configurations and/or updated sidelink beam measurement configurations and/or updated sidelink beam report configurations may be transmitted via a PC5 MAC-CE message used to activate the updated SBMG configurations (e.g., SBMGconfigUpdate1, SBMGconfigUpdate2, and/or SBMGconfigUpdate3 via the index or ID of a configuration).

Moreover, in aspects in which a first Rx UE (e.g., the Rx UE1 1204) and a second Rx UE (e.g., the Rx UE2 1206) are associated with a same device (e.g., associated with a same deviceID or Layer 2 fingerprint L2FP), a same updated SBMG configuration and/or updated sidelink beam measurement configuration and/or updated sidelink beam report configuration may be associated with the first UE and the second UE (e.g., SBMGconfigUpdate1 and SBMGconfigUpdate2 may be the same updated SBMG configuration). Additionally, or alternatively, in aspects in which the same updated SBMG configuration and/or updated sidelink beam measurement configuration and/or updated sidelink beam report configuration is associated with two co-located Rx UEs and/or two Rx UEs associated with a same physical device (e.g., the Rx UE1 1204 and the Rx UE2 1206), the Tx UE 1202 may transmit the updated SBMG configuration and/or updated sidelink beam measurement configuration and/or updated sidelink beam report configuration to one or both of the Rx UEs (e.g., the Tx UE 1202 may transmit the updated SBMG configuration only to the Rx UE1 1204, only to the Rx UE2 1206, or to both the Rx UE1 1204 and the Rx UE2 1206), based on the device ID deviceID or Layer 2 fingerprint L2FP. This may reduce signaling overhead and resource consumption otherwise associated with transmitting and receiving redundant updated SBMG configurations.

Additionally, or alternatively, and in a similar manner as described above in connection with the SBMG configurations, each updated SBMG configuration, of the one or more updated SBMG configurations (e.g., SBMGconfigUpdate1, SBMGconfigUpdate2, and/or SBMGconfigUpdate3), may be associated with at least one of an SBMGP, an SBMGO, or an SBMGL, such as one of the SBMGPs, SBMGOs, or SBMGLs described above in connection with FIGS. 10 and 11. Additionally, or alternatively, in some aspects, at least one of a starting radio frame associated with an SBMG associated with each updated SBMG configuration and a starting subframe withing the radio frame associated with the SBMG associated with each updated SBMG configuration may be associated with a DFN and the SBMGO. For example, as described above in connection with FIG. 10, the SBMG may start in (e.g., a first instance of the SBMG may be included in) a radio frame associated with a DFN that satisfies the criterion $$DFN \bmod \left\lfloor \frac{SBMGO}{10} \right\rfloor = \left\lfloor \frac{SBMGO}{10} \right\rfloor,$$

and the a subframe within the radio frame in which an index of the subframe is equal to the expression SBMGO mod 10, or the SBMG may start in (e.g., a first instance of the SBMG may be included in) a DFN that satisfies the criterion DFN mod SBMGO=SBMGO.

The Rx UE1 1204, the Rx UE2 1206, and/or the Rx UE3 1208 may configure themselves based at least in part on the updated configuration information. In some aspects, the Rx UE1 1204, the Rx UE2 1206, and/or the Rx UE3 1208 may be configured to perform one or more operations described herein based at least in part on the updated configuration information.

Based at least in part on the Tx UE 1202 configuring and/or activating one or more SBMG configurations for one or more Rx UEs as described above, signaling overhead associated with sidelink beam measurement may be reduced, leading to reduced latency associated with sidelink communications, increased throughput associated with sidelink communications, more reliable communication channels between paired UEs, and overall more efficient usage of network resources for sidelink communications.

As indicated above, FIG. 12 is provided as an example. Other examples may differ from what is described with respect to FIG. 12.

FIG. 13 is a diagram of an example 1300 associated with sidelink beam measurement and reporting, in accordance with the present disclosure. As shown in FIG. 13, a Tx UE 1302 (e.g., Tx UE 1202) may communicate with one or more Rx UEs, including Rx UE1 1304 (e.g., Rx UE1 1204), Rx UE2 1306 (e.g., Rx UE2 1206), and Rx UE3 1308 (e.g., Rx UE3 1208). In some aspects, the Tx UE 1302, the Rx UE1 1304, the Rx UE2 1306, and the Rx UE3 1308 may be included in a wireless network (e.g., wireless network 100). The Tx UE 1302, the Rx UE1 1304, the Rx UE2 1306, and the Rx UE3 1308 may have established a wireless connection prior to operations shown in FIG. 13, such as for communicating by beamforming as described above in connection with FIGS. 6-11. In some aspects, the Rx UE1 1304 and the Rx UE2 1306 may be co-located (e.g., associated with QCLed sidelink beams or associated with a same spatial filter or spatial relationship (same ID or index)) and/or associated with a same physical device (e.g., associated with a same physical sidelink beam pair link and/or device ID), similar to the Rx UE1 1004 and the Rx UE2 1006 described above in connection with FIG. 10.

As shown by reference numbers 1310, 1312, and 1314, the Tx UE 1302 may transmit, and the Rx UE1 1304, the Rx UE2 1306, and the Rx UE3 1308 may receive, beam management configuration information indicating one or more SBMG configurations (e.g., SBMGconfig), sidelink beam measurement configuration and/or sidelink beam report configuration, associated with an S-RSB configuration (e.g., with or without SCI or PSSCH) or an S-RSB burst configuration (e.g., with the same or different S-RSB structures within the S-RSB burst), in a similar manner as described above in connection with reference numbers 1224, 1226, and 1228. For example, as indicated by reference number 1310, the Tx UE 1302 may transmit, and the Rx UE1 1304 may receive, a first SBMG configuration (e.g., SBMGconfig1), a first sidelink beam measurement configuration and/or a first sidelink beam report configuration; as indicated by reference number 1312, the Tx UE 1302 may transmit, and the Rx UE2 1306 may receive, a second SBMG configuration (e.g., SBMGconfig2) a second sidelink beam measurement configuration and/or a second sidelink beam report configuration; and/or as indicated by reference number 1314, the Tx UE 1302 may transmit, and the Rx UE3 1308 may receive, a third SBMG configuration (e.g., SBMGconfig3)), a third sidelink beam measurement configuration and/or a third sidelink beam report configuration. In some aspects, the indication of the one or more SBMG configurations, one or more sidelink beam measurement configurations and/or one or more sidelink beam report configurations may be transmitted via a PC5 RRC message, such as a PC5 RRC configuration communication. In some other aspects, the indication of the one or more SBMG configurations, one or more beam measurement configurations and/or one or more sidelink beam report configurations may be transmitted via a PC5 MAC-CE message used to activate the SBMG configurations, sidelink beam measurement configurations and/or sidelink beam report configurations (e.g., SBMGconfig1, SBMGconfig2, and/or SBMGconfig3).

Moreover, in aspects in which a first Rx UE (e.g., the Rx UE1 1304) and a second Rx UE (e.g., the Rx UE2 1306) are co-located (e.g., QCLed) and/or associated with a same device (e.g., associated with a same deviceID), a same SBMG configuration, sidelink beam measurement configuration and/or sidelink beam report configuration may be associated with the first UE and the second UE (e.g., SBMGconfig1 and SBMGconfig2 may be the same SBMG configuration). Additionally, or alternatively, in aspects in which the same SBMG configuration, sidelink beam measurement configuration and/or sidelink beam report configuration is associated with two co-located Rx UEs and/or two Rx UEs associated with a same physical device (e.g., Rx UE1 1304 and Rx UE2 1306), the Tx UE 1302 may transmit the SBMG configuration, sidelink beam measurement configuration and/or sidelink beam report configuration to one or both of the Rx UEs (e.g., the Tx UE 1302 may transmit the SBMG configuration, sidelink beam measurement configuration and/or sidelink beam report configuration only to the Rx UE1 1304, only to the Rx UE2 1306, or to both the Rx UE1 1304 and the Rx UE2 1306). This may reduce signaling overhead and/or resource consumption associated with transmitting and receiving redundant SBMG configurations.

In some aspects, each of the one or more SBMG configurations (e.g., SBMGconfig1, SBMGconfig2, and/or SBMGconfig3), each of one or more beam measurement configurations and/or each of one or more sidelink beam report configurations, may be associated with at least one of an SBMGP, an SBMGO, or an SBMGL, such as one of the SBMGPs, SBMGOs, or SBMGLs described above in connection with FIGS. 10 and 11. Additionally, or alternatively, in some aspects, at least one of a starting radio frame associated with an SBMG associated with each SBMG configuration or a starting radio subframe associated with the SBMG associated with each SBMG configuration may be associated with a DFN and the SBMGO. For example, as described above in connection with FIG. 10, the SBMG may start in (e.g., a first instance of the SBMG may be included in) a radio frame associated with a DFN that satisfies the criterion $$DFN \bmod \left\lfloor \frac{SBMGO}{10} \right\rfloor = \left\lfloor \frac{SBMGO}{10} \right\rfloor,$$

and a subframe within the radio frame in which an index of the subframe is equal to the expression SBMGO mod 10, or the SBMG may start in (e.g., a first instance of the SBMG may be included in) a DFN that satisfies the criterion DFN mod SBMGO=SBMGO.

The Rx UE1 1304, the Rx UE2 1306, and/or the Rx UE3 1308 may each configure itself based at least in part on the configuration information. In some aspects, the Rx UE1 1304, the Rx UE2 1306, and/or the Rx UE3 1308 may be configured to perform one or more operations described herein based at least in part on the configuration information.

As shown by reference number 1316, the Tx UE 1302 may sense and select resources within the one or more resource sets associated with transmitting one or more S-RSB bursts in an SBMG based at least in part on the one or more SBMG configurations (e.g., SBMGconfig1, SBMGconfig2, and/or SBMGconfig3), one or more sidelink beam measurement configurations and/or one or more sidelink beam report configurations. For example, the Tx UE 1302 may perform a sensing operation (e.g., decoding the SCI of a received S-RSB if present or measuring the RSSI or RSRP of a received S-RSB) in the resource set and/or within the sidelink resource pool for sidelink beam measurement and/or sidelink beam report in order to determine time and/or frequency resources for transmitting one or more S-RSB bursts (e.g., resources to be used for the SBMG) during one or more SBMGs associated with the one or more SBMG configurations, one or more sidelink beam measurement configurations and/or one or more sidelink beam report configurations. In some aspects, sensing and selecting resources associated with transmitting the one or more S-RSB bursts in the SBMG may include determining time domain resources in which the one or more Rx UEs (e.g., the Rx UE1 1304, the Rx UE2 1306, and/or the Rx UE3 1308) are not in an SL DRX active time duration, such as one of the SL DRX active time durations described above in connection with reference numbers 1016, 1018, and 1020. By sensing and selecting resources for transmitting one or more S-RSB bursts during one or more SBMGs, the Tx UE 1302 may reduce interference by selecting resources associated with little communication traffic and/or low noise (e.g., based on decoding the received SCI if present or based on the measurement such as RSSI or RSRP).

As shown by reference number 1318, the one or more SBMG configurations may be associated with an SBMG, which may correspond to any of the SBMGs described above in connection with FIGS. 10-12 (e.g., SBMG 1024, SBMG1 1102, SBMG2 1104, SBMG3 1106, and/or the SBMG 1236). Accordingly, as shown by reference number 1320, one or more Rx UEs (e.g., the Rx UE1 1304, the Rx UE2 1306, and/or the Rx UE3 1308) may start to monitor one or more S-RSB bursts in the SBMG based at least in part on the one or more SBMG configurations (e.g., SBMGconfig1, SBMGconfig2, and/or SBMGconfig3) within the resource set or sidelink resource pool for sidelink beam measurement and/or sidelink beam report. In aspects in which a first Rx UE (e.g., the Rx UE1 1304) and a second Rx UE (e.g., the Rx UE2 1306) are co-located (e.g., QCLed) and/or associated with a same device (e.g., associated with a same device ID deviceID or Layer 2 fingerprint L2FP), one of the first Rx UE and the second Rx UE may refrain from monitoring the one or more S-RSB bursts in the SBMG. For example, when a first Rx UE (e.g., the Rx UE1 1304) and a second Rx UE (e.g., the Rx UE2 1306) are associated with a same SBMG configuration, only the first Rx UE may monitor the one or more S-RSBs, only the second Rx UE may monitor the one or more S-RSBs, or both the first Rx UE and the second Rx UE may monitor the S-RSBs. For example, in aspects in which the first Rx UE and the second Rx UE are associated with the same SBMG configuration and the Tx UE 1302 transmits the SBMG configuration only to one of the first Rx UE or the second Rx UE, the Rx UE which received the SBMG configuration may monitor the S-RSBs, while the Rx UE which did not receive the SBMG configuration may refrain from monitoring the S-RSBs. This may conserve signaling overhead resource consumption that would otherwise be consumed with redundant monitoring and/or measurements. Additionally or alternatively, the Layer 3 or Layer 2 or Layer 1 may determine that either the first Rx UE or the second Rx UE may monitor the S-RSBs based on the shared device ID deviceID or Layer 2 fingerprint L2FP (e.g., randomly, deviceID mod 1 or L2FP mod 1 (e.g., even or odd number)).

In some aspects, monitoring the one or more S-RSB bursts in the SBMG includes monitoring swept beams in the SBMG. More particularly, as shown by reference numbers 1322, 1324, 1326, and 1328, the Tx UE 1302 may transmit, and the Rx UE1 1304, the Rx UE2 1306, and/or the Rx UE3 1308 may receive, one or more S-RSB bursts in the SBMG based at least in part on one or more SBMG configurations, one or more sidelink beam measurement configurations and/or one or more sidelink beam report configurations. The one or more S-RSB bursts may correspond to any of the S-RSB bursts described above in connection with FIGS. 10-12. In some aspects, transmitting the one or more S-RSB bursts in the SBMG based at least in part on one or more SBMG configurations, one or more sidelink beam measurement configurations and/or one or more sidelink beam report configurations may include sweeping multiple beams using the selected resources described above in connection with reference number 1316. More particularly, as indicated by reference number 1322, the Tx UE 1302 may sweep beams associated with a first S-RSB burst (sometimes referred to as S-RSBburst1) to one or more of the Rx UE1 1304, the Rx UE2 1306, and/or the Rx UE3 1308 using at least some of the selected resources; as indicated by reference number 1324, the Tx UE 1302 may sweep beams associated with a second S-RSB burst (sometimes referred to as S-RSBburst2) to one or more of the Rx UE1 1304, the Rx UE2 1306, and/or the Rx UE3 1308 using at least some of the selected resources; as indicated by reference number 1326, the Tx UE 1302 may sweep beams associated with a third S-RSB burst (sometimes referred to as S-RSBburst3) to one or more of the Rx UE1 1304, the Rx UE2 1306, and/or the Rx UE3 1308 using at least some of the selected resources; and as indicated by reference number 1328, the Tx UE 1302 may sweep beams associated with a fourth S-RSB burst (sometimes referred to as S-RSBburst4) to one or more of the Rx UE1 1304, the Rx UE2 1306, and/or the Rx UE3 1308 using at least some of the selected resources.

In some aspects, certain S-RSB bursts may be associated with a subset of all Rx UEs. Put another way, based at least in part on the one or more SBMG configurations, one or more sidelink beam measurement configurations and/or one or more sidelink beam report configurations, Rx UE requirements, or similar information, certain S-RSB bursts may be transmitted only to certain Rx UEs. For example, S-RSBburst1 and S-RSBburst2 may be provided for Rx UE1 1304, Rx UE2 1306, and Rx UE3 1308; S-RSBburst3 may be provided for Rx UE2 1306 and Rx UE3 1308; and S-RSBburst4 may be provided for Rx UE3 1308. In such aspects, the various S-RSB bursts may be provided to respective Rx UEs for certain purposes, such as beam fine tuning, monitoring of candidate beams, updating a beam list, or for similar purposes. The Rx UE1 1304, the Rx UE2 1306, and/or the Rx UE3 1308 may thus monitor and/or measure S-RSBs, accordingly. For example, returning to the above example, the Rx UE1 1304 may monitor and/or measure beams associated with S-RSBburst1 and/or S-RSBburst2 for purposes of fine tuning one or more Tx beams and/or one or more Rx beams. The Rx UE2 1306 may monitor and/or measure beams associated with S-RSBburst1, S-RSBburst2, and/or S-RSBburst3 for purposes of fine tuning one or more Tx beams and/or one or more Rx beams, and/or for purposes of monitoring candidate beams. Rx UE3 1308 may monitor and/or measure beams associated with S-RSBburst1, S-RSBburst2, S-RSBburst3, and/or S-RSBburst4 for purposes of performing a full beam scan to update a beams list for future monitoring.

As shown by reference number 1330, one or more of the Rx UE1 1304, the Rx UE2 1306, and the Rx UE3 1308 may sense and select resources associated with transmitting one or more beam reports or beam measurement reports based at least in part on the one or more SBMG configurations. For example, in some aspects, each of the Rx UE1 1304, the Rx UE2 1306, and the Rx UE3 1308 may sense and select resources for transmitting, in the SBMG, a sidelink beam measurement report based at least in part on a received SBMG configuration (e.g., based at least in part on SBMGconfig1, SBMGconfig2, and/or SBMGconfig3), sidelink beam measurement configuration and/or sidelink beam report configuration. By sensing and selecting resources (e.g., based on decoding the received SCI if present or based on a measurement such as RSSI or RSRP being above or below a threshold) for transmitting the one or more beam reports or beam measurement reports during the SBMG, the Rx UEs may reduce interference by selecting resources associated with little communication traffic and/or low noise.

Moreover, in aspects in which a first Rx UE (e.g., the Rx UE1 1304) and a second Rx UE (e.g., the Rx UE2 1306) are co-located (e.g., QCLed) and/or associated with a same device (e.g., associated with a same deviceID), one of the first Rx UE and the second Rx UE may refrain from sensing and selecting resources associated with transmitting one or more beam reports or beam measurement reports based at least in part on the one or more SBMG configurations, one or more sidelink beam measurement configurations and/or one or more sidelink beam report configurations. For example, when a first Rx UE (e.g., the Rx UE1 1304) and a second Rx UE (e.g., the Rx UE2 1306) are associated with a same SBMG configuration, sidelink beam measurement configuration and/or sidelink beam report configuration, only the first Rx UE may sense and select resources associated with transmitting a beam measurement report, only the second Rx UE may sense and select resources associated with transmitting a beam measurement report, or both the first Rx UE and the second Rx UE may sense and select resources associated with transmitting a beam measurement report. For example, in aspects in which the first Rx UE and the second Rx UE are associated with the same SBMG configuration, sidelink beam measurement configuration and/or sidelink beam report configuration and the Tx UE 1302 transmits the SBMG configuration to only one of the first Rx UE or the second Rx UE, the Rx UE which received the SBMG configuration may sense and select resources associated with transmitting the beam measurement report, while the Rx UE which did not receive the SBMG configuration, sidelink beam measurement configuration and/or sidelink beam report configuration may refrain from sensing and selecting resources associated with transmitting the beam measurement report. Additionally or alternatively, the Layer 3 or Layer 2 or Layer 1 may determine that either the first Rx UE or the second Rx UE may sense and select resources associated with transmitting a beam measurement report based on the shared device ID deviceID or Layer 2 fingerprint L2FP (e.g., randomly, deviceID mod 1 or L2FP mod 1 (e.g., even or odd number)).

This may conserve signaling overhead and/or resource consumption that would otherwise be consumed by sensing and selecting resources for transmitting redundant measurement reports.

As shown by reference numbers 1332, 1334, and 1336, the Rx UE1 1304, the Rx UE2 1306, and/or the Rx UE3 1308 may transmit, and the Tx UE 1302 may receive, one or more beam reports or beam measurement reports based at least in part on the one or more S-RSB bursts (e.g., S-RSBburst1, S-RSBburst2, S-RSBburst3, and/or S-RSBburst4) and the one or more SBMG configurations (e.g., SBMGconfig1, SBMGconfig2, and/or SBMGconfig3), one or more sidelink beam measurement configurations and/or one or more sidelink beam report configurations. More particularly, the Rx UE1 1304 may transmit, and the Tx UE 1302 may receive, a first beam measurement report (e.g., SL-RSRP-report1); the Rx UE2 1306 may transmit, and the Tx UE 1302 may receive, a second beam measurement report (e.g., SL-RSRP-report2); and/or the Rx UE3 1308 may transmit, and the Tx UE 1302 may receive, a third beam measurement report (e.g., SL-RSRP-report3). As described above in connection with reference numbers 1238, 1240, and 1242, the one or more beam reports or beam measurement reports may be associated with a Layer 3 sidelink RSRP measurement report (e.g., L3 SL-RSRP report), which may be transmitted via a PC5 RRC message or a similar communication; a Layer 2 sidelink RSRP measurement report (e.g., L2 SL-RSRP report), which may be transmitted via a MAC-CE message or a similar communication; or a Layer 1 sidelink RSRP measurement report (e.g., L1 SL-RSRP report), which may be transmitted via a multi-bit PSFCH message or an SCI or MAC CE multiplexed with PSSCH or a similar communication.

Moreover, in aspects in which the same SBMG configuration is associated with two co-located Rx UEs and/or two Rx UEs associated with a same physical device (e.g., the Rx UE1 1304 and the Rx UE2 1306), the Tx UE 1302 may receive a single beam measurement report associated with both Rx UEs. For example, in aspects in which the Tx UE 1302 transmits a single SBMG configuration, sidelink beam measurement configuration and/or sidelink beam report configuration, that is associated with both the Rx UE1 1304 and the Rx UE2 1306, to only one of the Rx UE1 1304 or the Rx UE2 1306, the Tx UE 1202 may receive a single beam measurement report, associated with both the Rx UE1 1304 and the Rx UE2 1306, from the Rx UE to which the SBMG configuration, sidelink beam measurement configuration and/or sidelink beam report configuration was transmitted. Additionally or alternatively, the Lay3 or Layer 2 or Layer 1 may determine that either the first Rx UE or the second Rx UE may transmit a beam measurement report based on the shared device ID deviceID or Layer 2 fingerprint L2FP (e.g., randomly, deviceID mod 1 or L2FP mod 1 (e.g., even or odd number)). This may conserve power, computing, and/or network resources that would otherwise be consumed by transmitting redundant measurement reports.

Based at least in part on the Tx UE 1302 transmitting one or more S-RSB bursts in an SBMG as described above, signaling overhead associated with sidelink beam measurement may be reduced, leading to reduced latency associated with sidelink communications, increased throughput associated with sidelink communications, more reliable communication channels between paired UEs, and overall more efficient usage of network resources for sidelink communications.

In some aspects, when an SL DRX active time with continuous transmissions or retransmissions overlaps with an SBMG, the UE may determine whether to stay with the continuous sidelink communications within the SL DRX active time or not. For example, the Tx UE and Rx UE may continue the sidelink communications with the SL DRX active time and ignore the SBMG preconfigured or configured. For another example, the Tx UE and Rx UE may switch to sidelink beam measurement and report within the SBMG preconfigured or configured, based on the sidelink beam pair link performance (e.g., need to fine tune the beam or select a beam to switch to for improving the received RSRP, RSRQ, and/or SINR associated with the sidelink transmissions).

As indicated above, FIG. 13 is provided as an example. Other examples may differ from what is described with respect to FIG. 13.

Figure 14:
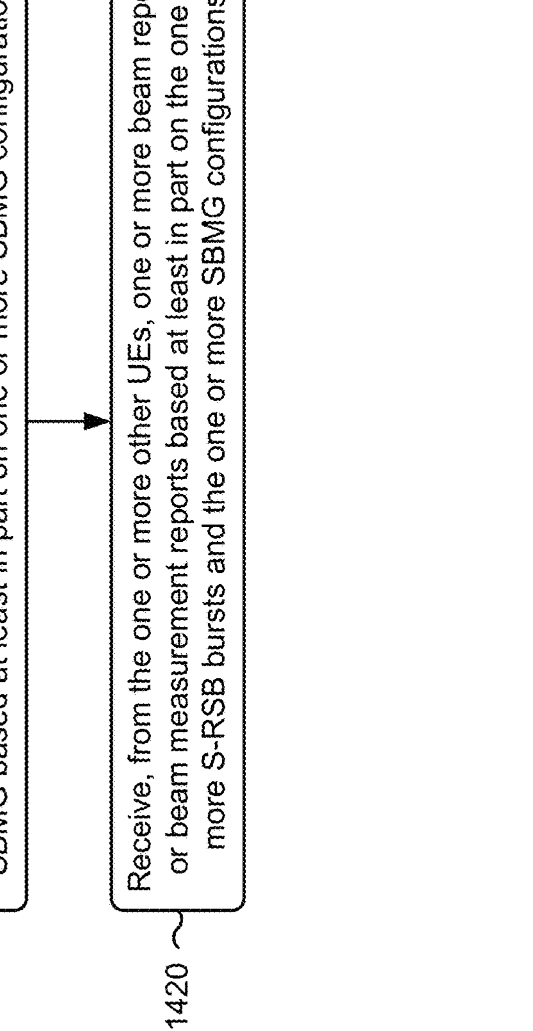
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., Tx UE 1202, Tx UE 1302) performs operations associated with a sidelink beam measurement gap for transmitting sidelink reference signal block bursts.

As shown in FIG. 14, in some aspects, process 1400 may include transmitting, to one or more other UEs, one or more S-RSB bursts in an SBMG based at least in part on one or more SBMG configurations (block 1410). For example, the UE (e.g., using communication manager 1608 and/or transmission component 1604, depicted in FIG. 16) may transmit, to one or more other UEs, one or more S-RSB bursts in an SBMG based at least in part on one or more SBMG configurations, as described above.

As further shown in FIG. 14, in some aspects, process 1400 may include receiving, from the one or more other UEs, one or more beam reports or beam measurement reports based at least in part on the one or more S-RSB bursts and the one or more SBMG configurations (block 1420). For example, the UE (e.g., using communication manager 1608 and/or reception component 1602, depicted in FIG. 16) may receive, from the one or more other UEs, one or more beam reports or beam measurement reports based at least in part on the one or more S-RSB bursts and the one or more SBMG configurations, as described above.

Process 1400 may include additional aspects, such as any single aspect or any combination of aspects described below and/or in connection with one or more other processes described elsewhere herein.

In a first aspect, process 1400 includes transmitting, to the one or more other UEs, configuration information indicating the one or more SBMG configurations.

In a second aspect, alone or in combination with the first aspect, a first UE, of the one or more other UEs, and a second UE, of the one or more other UEs, are associated with a same device, and transmitting the configuration information includes transmitting, to at least one of the first UE or the second UE, a same SBMG configuration, of the one or more SBMG configurations.

In a third aspect, alone or in combination with one or more of the first and second aspects, process 1400 includes receiving, from the one or more other UEs, UE information indicating, for each UE, of the one or more other UEs, at least one of a monitoring beam list associated with a corresponding UE, a sidelink discontinuous reception configuration associated with the corresponding UE, a location associated with the corresponding UE, a velocity associated with the corresponding UE, a device identifier associated with the corresponding UE, or a layer 2 fingerprint associated with the corresponding UE.

In a fourth aspect, alone or in combination with one or more of the first through third aspects, the one or more SBMG configurations are based at least in part on the UE information.

In a fifth aspect, alone or in combination with one or more of the first through fourth aspects, a first UE, of the one or more other UEs, and a second UE, of the one or more other UEs, are associated with a same device, and a same SBMG configuration, of the one or more SBMG configurations, is associated with the first UE and the second UE.

In a sixth aspect, alone or in combination with one or more of the first through fifth aspects, receiving the one or more beam reports or beam measurement reports includes receiving, from the first UE or the second UE, a beam report or a beam measurement report, of the one or more beam reports or beam measurement reports, associated with the first UE and the second UE.

In a seventh aspect, alone or in combination with one or more of the first through sixth aspects, process 1400 includes transmitting, to the one or more other UEs, configuration information indicating one or more updated SBMG configurations based at least in part on the one or more beam reports or beam measurement reports.

In an eighth aspect, alone or in combination with one or more of the first through seventh aspects, a first UE, of the one or more other UEs, and a second UE, of the one or more other UEs, are associated with a same device, and a same updated SBMG configuration, of the one or more updated SBMG configurations, is associated with the first UE and the second UE.

In a ninth aspect, alone or in combination with one or more of the first through eighth aspects, process 1400 includes sensing and selecting resources associated with transmitting the one or more S-RSB bursts in the SBMG based at least in part on the one or more SBMG configurations.

In a tenth aspect, alone or in combination with one or more of the first through ninth aspects, process 1400 includes sweeping multiple beams using the selected resources.

In an eleventh aspect, alone or in combination with one or more of the first through tenth aspects, each SBMG configuration, of the one or more SBMG configurations, is associated with at least one of an SBMG period, an SBMG offset, or an SBMG length.

In a twelfth aspect, alone or in combination with one or more of the first through eleventh aspects, at least one of a starting radio frame associated with the SBMG or a starting radio subframe associated with the SBMG is associated with a direct frame number and the SBMG offset.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a first UE, in accordance with the present disclosure. Example process 1500 is an example where the first UE (e.g., Rx UE1 1204, Rx UE2 1206, Rx UE3 1208, Rx UE1 1304, Rx UE2 1306, Rx UE3 1308) performs operations associated with a sidelink beam measurement gap for transmitting sidelink reference signal block bursts.

As shown in FIG. 15, in some aspects, process 1500 may include monitoring one or more S-RSB bursts in an SBMG based at least in part on an SBMG configuration (block 1510). For example, the UE (e.g., using communication manager 1708 and/or monitoring component 1710, depicted in FIG. 17) may monitor one or more S-RSB bursts in an SBMG based at least in part on an SBMG configuration, as described above.

As further shown in FIG. 15, in some aspects, process 1500 may include transmitting, to a second UE, a beam report or a beam measurement report based at least in part on the one or more S-RSB bursts and the SBMG configuration (block 1520). For example, the UE (e.g., using communication manager 1708 and/or transmission component 1704, depicted in FIG. 17) may transmit, to a second UE, a beam measurement report or a beam report based at least in part on the one or more S-RSB bursts and the SBMG configuration, as described above.

Process 1500 may include additional aspects, such as any single aspect or any combination of aspects described below and/or in connection with one or more other processes described elsewhere herein.

In a first aspect, process 1500 includes receiving, from the second UE, configuration information indicating the SBMG configuration.

In a second aspect, alone or in combination with the first aspect, process 1500 includes transmitting, to the second UE, UE information indicating at least one of a monitoring beam list associated with the first UE, a sidelink discontinuous reception configuration associated with the first UE, a location associated with the first UE, a velocity associated with the first UE, a device identifier associated with the first UE, or a layer 2 fingerprint associated with the first UE.

In a third aspect, alone or in combination with one or more of the first and second aspects, the SBMG configuration is based at least in part on the UE information.

In a fourth aspect, alone or in combination with one or more of the first through third aspects, the first UE and a third UE are associated with a same device, and the SBMG configuration is associated with the first UE and the third UE.

In a fifth aspect, alone or in combination with one or more of the first through fourth aspects, the beam report or the beam measurement report is associated with the first UE and the third UE.

In a sixth aspect, alone or in combination with one or more of the first through fifth aspects, process 1500 includes receiving, from the second UE, configuration information indicating an updated SBMG configuration based at least in part on the beam report or the beam measurement report.

In a seventh aspect, alone or in combination with one or more of the first through sixth aspects, the first UE and a third UE are associated with a same device, and the updated SBMG configuration is associated with the first UE and the third UE.

In an eighth aspect, alone or in combination with one or more of the first through seventh aspects, monitoring the one or more S-RSB bursts in the SBMG includes monitoring swept beams in the SBMG.

In a ninth aspect, alone or in combination with one or more of the first through eighth aspects, process 1500 includes sensing and selecting resources associated with transmitting the beam report or the beam measurement report based at least in part on the SBMG configuration.

In a tenth aspect, alone or in combination with one or more of the first through ninth aspects, the SBMG configuration is associated with at least one of an SBMG period, an SBMG offset, or an SBMG length.

In an eleventh aspect, alone or in combination with one or more of the first through tenth aspects, at least one of a starting radio frame associated with the SBMG or a starting radio subframe associated with the SBMG is associated with a direct frame number and the SBMG offset.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
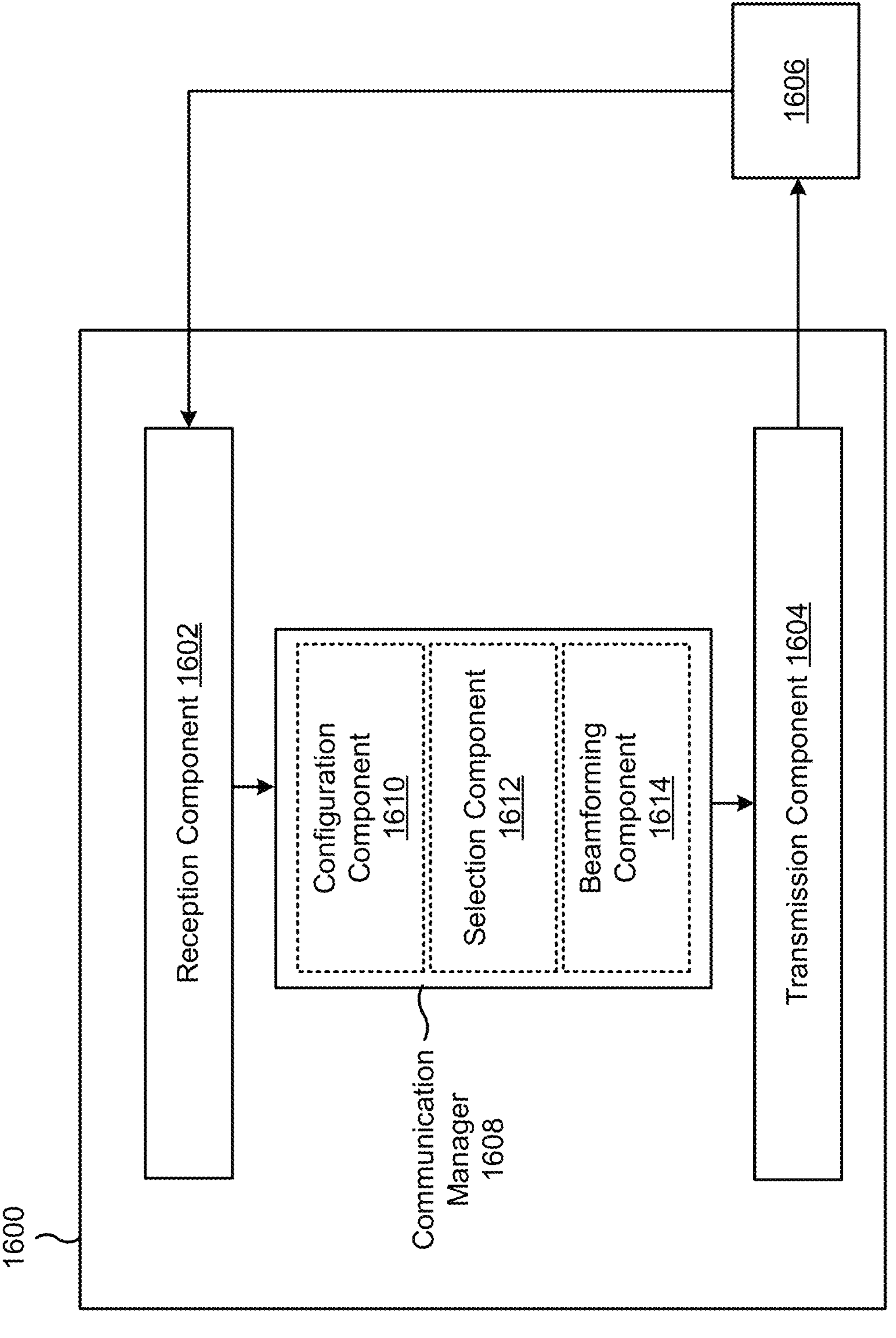
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a UE (e.g., Tx UE 1202, Tx UE 1302), or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a network node, or another wireless communication device) using the reception component 1602 and the transmission component 1604. As further shown, the apparatus 1600 may include the communication manager 1608 (e.g., communication manager 140). The communication manager 1608 may include one or more of a configuration component 1610, a selection component 1612, or a beamforming component 1614, among other examples.

In some aspects, the apparatus 1600 may be configured to perform one or more operations described herein in connection with FIGS. 10-13. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the UE 120 described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE 120 described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE 120 described in connection with FIG. 2. In some aspects, the transmission component 1604 may be co-located with the reception component 1602 in a transceiver.

The transmission component 1604 may transmit, to one or more other UEs, one or more S-RSB bursts in an SBMG based at least in part on one or more SBMG configurations. The reception component 1602 may receive, from the one or more other UEs, one or more beam reports or beam measurement reports based at least in part on the one or more S-RSB bursts and the one or more SBMG configurations.

The transmission component 1604 and/or the configuration component 1610 may transmit, to the one or more other UEs, configuration information indicating the one or more SBMG configurations.

The reception component 1602 may receive, from the one or more other UEs, UE information indicating, for each UE, of the one or more other UEs, at least one of a monitoring beam list associated with a corresponding UE, a sidelink discontinuous reception configuration associated with the corresponding UE, a location associated with the corresponding UE, a velocity associated with the corresponding UE, a device identifier associated with the corresponding UE, or a layer 2 fingerprint associated with the corresponding UE.

The transmission component 1604 and/or the configuration component 1610 may transmit, to the one or more other UEs, configuration information indicating one or more updated SBMG configurations based at least in part on the one or more beam reports or beam measurement reports.

The selection component 1612 may sense and select resources associated with transmitting the one or more S-RSB bursts in the SBMG based at least in part on the one or more SBMG configurations.

The beamforming component 1614 may sweep multiple beams using the selected resources.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
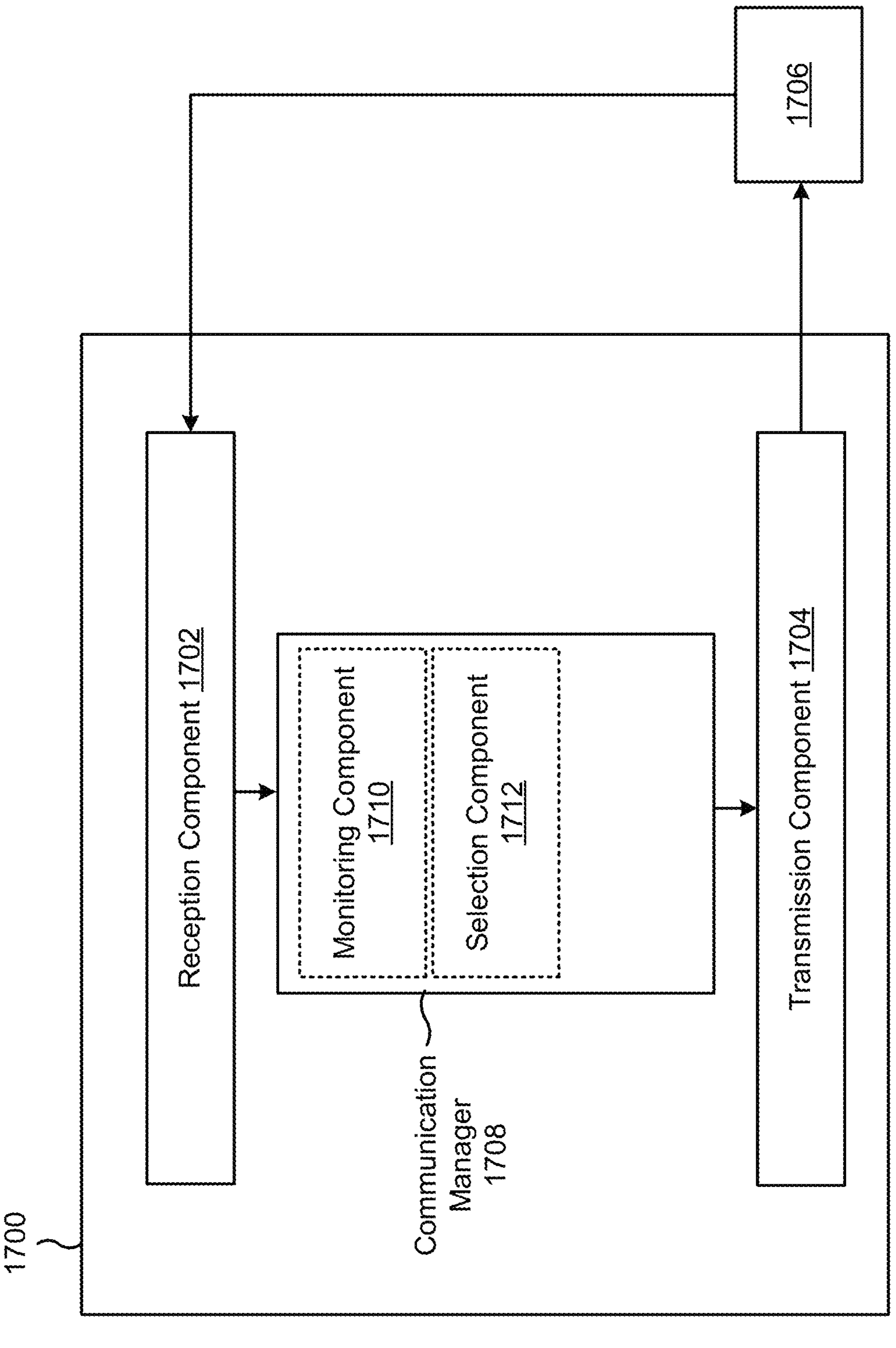
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a first UE (e.g., Rx UE1 1204, Rx UE2 1206, Rx UE3 1208, Rx UE1 1304, Rx UE2 1306, Rx UE3 1308), or a first UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a network node, or another wireless communication device) using the reception component 1702 and the transmission component 1704. As further shown, the apparatus 1700 may include the communication manager 1708 (e.g., communication manager 140). The communication manager 1708 may include one or more of a monitoring component 1710, or a selection component 1712, among other examples.

In some aspects, the apparatus 1700 may be configured to perform one or more operations described herein in connection with FIGS. 10-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the UE 120 described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE 120 described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE 120 described in connection with FIG. 2. In some aspects, the transmission component 1704 may be co-located with the reception component 1702 in a transceiver.

The monitoring component 1710 may monitor one or more S-RSB bursts in an SBMG based at least in part on an SBMG configuration. The transmission component 1704 may transmit, to a second UE, a beam report or a beam measurement report based at least in part on the one or more S-RSB bursts and the SBMG configuration.

The reception component 1702 may receive, from the second UE, configuration information indicating the SBMG configuration.

The transmission component 1704 may transmit, to the second UE, UE information indicating at least one of a monitoring beam list associated with the first UE, a sidelink discontinuous reception configuration associated with the first UE, a location associated with the first UE, a velocity associated with the first UE, a device identifier associated with the first UE, or a layer 2 fingerprint associated with the first UE.

The reception component 1702 may receive, from the second UE, configuration information indicating an updated SBMG configuration based at least in part on the beam report or the beam measurement report.

The selection component 1712 may sense and select resources associated with transmitting the beam report or the beam measurement report based at least in part on the SBMG configuration.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a UE, comprising: transmitting, to one or more other UEs, one or more S-RSB bursts in an SBMG based at least in part on one or more SBMG configurations; and receiving, from the one or more other UEs, one or more beam reports or beam measurement reports based at least in part on the one or more S-RSB bursts and the one or more SBMG configurations.

Aspect 2: The method of Aspect 1, further comprising transmitting, to the one or more other UEs, configuration information indicating the one or more SBMG configurations.

Aspect 3: The method of Aspect 2, wherein a first UE, of the one or more other UEs, and a second UE, of the one or more other UEs, are associated with a same device, and wherein transmitting the configuration information includes transmitting, to at least one of the first UE or the second UE, a same SBMG configuration, of the one or more SBMG configurations.

Aspect 4: The method of any of Aspects 1-3, further comprising receiving, from the one or more other UEs, UE information indicating, for each UE, of the one or more other UEs, at least one of: a monitoring beam list associated with a corresponding UE, a sidelink discontinuous reception configuration associated with the corresponding UE, a location associated with the corresponding UE, a velocity associated with the corresponding UE, a device identifier associated with the corresponding UE, or a layer 2 fingerprint associated with the corresponding UE.

Aspect 5: The method of Aspect 4, wherein the one or more SBMG configurations are based at least in part on the UE information.

Aspect 6: The method of any of Aspects 1-5, wherein a first UE, of the one or more other UEs, and a second UE, of the one or more other UEs, are associated with a same device, and wherein a same SBMG configuration, of the one or more SBMG configurations, is associated with the first UE and the second UE.

Aspect 7: The method of Aspect 6, wherein receiving the one or more beam reports or beam measurement reports includes receiving, from the first UE or the second UE, a beam report or a beam measurement report, of the one or more beam reports or beam measurement reports, associated with the first UE and the second UE.

Aspect 8: The method of any of Aspects 1-7, further comprising transmitting, to the one or more other UEs, configuration information indicating one or more updated SBMG configurations based at least in part on the one or more beam reports or beam measurement reports.

Aspect 9: The method of Aspect 8, wherein a first UE, of the one or more other UEs, and a second UE, of the one or more other UEs, are associated with a same device, and wherein a same updated SBMG configuration, of the one or more updated SBMG configurations, is associated with the first UE and the second UE.

Aspect 10: The method of any of Aspects 1-9, further comprising sensing and selecting resources associated with transmitting the one or more S-RSB bursts in the SBMG based at least in part on the one or more SBMG configurations.

Aspect 11: The method of Aspect 10, further comprising sweeping multiple beams using the selected resources.

Aspect 12: The method of any of Aspects 1-11, wherein each SBMG configuration, of the one or more SBMG configurations, is associated with at least one of an SBMG period, an SBMG offset, or an SBMG length.

Aspect 13: The method of any of Aspects 1-12, wherein each SBMG configuration, of the one or more SBMG configurations, is associated with an SBMG offset, and wherein at least one of a starting radio frame associated with the SBMG or a starting radio subframe associated with the SBMG is associated with a direct frame number and the SBMG offset.

Aspect 14: A method of wireless communication performed by a first UE, comprising: monitoring one or more S-RSB bursts in an SBMG based at least in part on an SBMG configuration; and transmitting, to a second UE, a beam report or a beam measurement report based at least in part on the one or more S-RSB bursts and the SBMG configuration.

Aspect 15: The method of Aspect 14, further comprising receiving, from the second UE, configuration information indicating the SBMG configuration.

Aspect 16: The method of any of Aspects 14-15, further comprising transmitting, to the second UE, UE information indicating at least one of: a monitoring beam list associated with the first UE, a sidelink discontinuous reception configuration associated with the first UE, a location associated with the first UE, a velocity associated with the first UE, a device identifier associated with the first UE, or a layer 2 fingerprint associated with the first UE.

Aspect 17: The method of Aspect 16, wherein the SBMG configuration is based at least in part on the UE information.

Aspect 18: The method of any of Aspects 14-17, wherein the first UE and a third UE are associated with a same device, and wherein the SBMG configuration is associated with the first UE and the third UE.

Aspect 19: The method of Aspect 18, wherein the beam report or the beam measurement report is associated with the first UE and the third UE.

Aspect 20: The method of any of Aspects 14-19, further comprising receiving, from the second UE, configuration information indicating an updated SBMG configuration based at least in part on the beam report or the beam measurement report.

Aspect 21: The method of Aspect 20, wherein the first UE and a third UE are associated with a same device, and wherein the updated SBMG configuration is associated with the first UE and the third UE.

Aspect 22: The method of any of Aspects 14-21, wherein monitoring the one or more S-RSB bursts in the SBMG includes monitoring swept beams in the SBMG.

Aspect 23: The method of any of Aspects 14-22, further comprising sensing and selecting resources associated with transmitting the beam report or the beam measurement report based at least in part on the SBMG configuration.

Aspect 24: The method of any of Aspects 14-23, wherein the SBMG configuration is associated with at least one of an SBMG period, an SBMG offset, or an SBMG length.

Aspect 25: The method of any of Aspects 14-24, wherein each SBMG configuration, of the one or more SBMG configurations, is associated with an SBMG offset, and wherein at least one of a starting radio frame associated with the SBMG or a starting radio subframe associated with the SBMG is associated with a direct frame number and the SBMG offset.

Aspect 26: An apparatus for wireless communication at a device, comprising a processor; memory coupled with the processor; and instructions stored in the memory and executable by the processor to cause the apparatus to perform the method of one or more of Aspects 1-13.

Aspect 27: A device for wireless communication, comprising a memory and one or more processors coupled to the memory, the one or more processors configured to perform the method of one or more of Aspects 1-13.

Aspect 28: An apparatus for wireless communication, comprising at least one means for performing the method of one or more of Aspects 1-13.

Aspect 29: A non-transitory computer-readable medium storing code for wireless communication, the code comprising instructions executable by a processor to perform the method of one or more of Aspects 1-13.

Aspect 30: A non-transitory computer-readable medium storing a set of instructions for wireless communication, the set of instructions comprising one or more instructions that, when executed by one or more processors of a device, cause the device to perform the method of one or more of Aspects 1-13.

Aspect 27: An apparatus for wireless communication at a device, comprising a processor; memory coupled with the processor; and instructions stored in the memory and executable by the processor to cause the apparatus to perform the method of one or more of Aspects 14-25.

Aspect 28: A device for wireless communication, comprising a memory and one or more processors coupled to the memory, the one or more processors configured to perform the method of one or more of Aspects 14-25.

Aspect 29: An apparatus for wireless communication, comprising at least one means for performing the method of one or more of Aspects 14-25.

Aspect 30: A non-transitory computer-readable medium storing code for wireless communication, the code comprising instructions executable by a processor to perform the method of one or more of Aspects 14-25.

Aspect 31: A non-transitory computer-readable medium storing a set of instructions for wireless communication, the set of instructions comprising one or more instructions that, when executed by one or more processors of a device, cause the device to perform the method of one or more of Aspects 14-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more memories; and one or more processors coupled to the one or more memories, the one or more processors individually or collectively configured to:

wirelessly transmit, to one or more other UEs, one or more sidelink reference signal block (S-RSB) bursts in a sidelink beam measurement gap (SBMG) based at least in part on one or more SBMG configurations;

wirelessly receive, from the one or more other UEs, one or more beam reports or beam measurement reports based at least in part on the one or more S-RSB bursts and the one or more SBMG configurations; and wirelessly transmit, to the one or more other UEs, configuration information indicating one or more updated SBMG configurations based at least in part on the one or more beam reports or beam measurement reports.

2. The UE of claim 1, wherein the one or more processors are further configured to transmit, to the one or more other UEs, configuration information indicating the one or more SBMG configurations.

3. The UE of claim 2, wherein a first UE, of the one or more other UEs, and a second UE, of the one or more other UEs, are associated with a same device, and wherein the one or more processors are further configured to transmit, to at least one of the first UE or the second UE, a same SBMG configuration, of the one or more SBMG configurations.

4. The UE of claim 1, wherein the one or more processors are further configured to receive, from the one or more other UEs, UE information indicating, for each UE, of the one or more other UEs, at least one of:

a monitoring beam list associated with a corresponding UE, a sidelink discontinuous reception configuration associated with the corresponding UE, a location associated with the corresponding UE, a velocity associated with the corresponding UE, a device identifier associated with the corresponding UE, or a layer 2 fingerprint associated with the corresponding UE.

5. The UE of claim 4, wherein the one or more SBMG configurations are based at least in part on the UE information.

6. The UE of claim 1, wherein a first UE, of the one or more other UEs, and a second UE, of the one or more other UEs, are associated with a same device, and wherein a same SBMG configuration, of the one or more SBMG configurations, is associated with the first UE and the second UE.

7. The UE of claim 6, wherein the one or more processors, to receive the one or more beam reports or beam measurement reports, are configured to receive, from the first UE or the second UE, a beam report or a beam measurement report, of the one or more beam reports or beam measurement reports, associated with the first UE and the second UE.

8. The UE of claim 1, wherein a first UE, of the one or more other UEs, and a second UE, of the one or more other UEs, are associated with a same device, and wherein a same updated SBMG configuration, of the one or more updated SBMG configurations, is associated with the first UE and the second UE.

9. The UE of claim 1, wherein the one or more processors are further configured to sense and select resources associated with transmitting the one or more S-RSB bursts in the SBMG based at least in part on the one or more SBMG configurations.

10. The UE of claim 9, wherein the one or more processors are further configured to sweep multiple beams using the selected resources.

11. The UE of claim 1, wherein each SBMG configuration, of the one or more SBMG configurations, is associated with at least one of an SBMG period, an SBMG offset, or an SBMG length.

12. The UE of claim 1, wherein each SBMG configuration, of the one or more SBMG configurations, is associated with an SBMG offset, and wherein at least one of a starting radio frame associated with the SBMG or a starting radio subframe associated with the SBMG is associated with a direct frame number and the SBMG offset.

13. A first user equipment (UE) for wireless communication, comprising:
- one or more memories; and
- one or more processors coupled to the one or more memories, the one or more processors individually or collectively configured to:
  - monitor one or more sidelink reference signal block (S-RSB) bursts in a sidelink beam measurement gap (SBMG) based at least in part on an SBMG configuration;
  - wirelessly transmit, to a second UE, a beam report or a beam measurement report based at least in part on the one or more S-RSB bursts and the SBMG configuration; and
  - wirelessly receive, from the second UE, configuration information indicating an updated SBMG configuration based at least in part on the beam report or the beam measurement report.

14. The first UE of claim 13, wherein the one or more processors are further configured to receive, from the second UE, configuration information indicating the SBMG configuration.

15. The first UE of claim 13, wherein the one or more processors are further configured to transmit, to the second UE, UE information indicating at least one of:
- a monitoring beam list associated with the first UE,
- a sidelink discontinuous reception configuration associated with the first UE,
- a location associated with the first UE,
- a velocity associated with the first UE,
- a device identifier associated with the first UE, or
- a layer 2 fingerprint associated with the first UE.

16. The first UE of claim 15, wherein the SBMG configuration is based at least in part on the UE information.

17. The first UE of claim 13, wherein the first UE and a third UE are associated with a same device, and wherein the SBMG configuration is associated with the first UE and the third UE.

18. The first UE of claim 17, wherein the beam report or the beam measurement report is associated with the first UE and the third UE.

19. The first UE of claim 13, wherein the first UE and a third UE are associated with a same device, and wherein the updated SBMG configuration is associated with the first UE and the third UE.

20. The first UE of claim 13, wherein the one or more processors, to monitor the one or more S-RSB bursts in the SBMG, are configured to monitor swept beams in the SBMG.

21. The first UE of claim 13, wherein the one or more processors are further configured to sense and select resources associated with transmitting the beam report or the beam measurement report based at least in part on the SBMG configuration.

22. The first UE of claim 13, wherein the SBMG configuration is associated with at least one of an SBMG period, an SBMG offset, or an SBMG length.

23. The first UE of claim 13, wherein each SBMG configuration, of the one or more SBMG configurations, is associated with an SBMG offset, and wherein at least one of a starting radio frame associated with the SBMG or a starting radio subframe associated with the SBMG is associated with a direct frame number and the SBMG offset.

24. A method of wireless communication performed by a user equipment (UE), comprising:
- transmitting, to one or more other UEs, one or more sidelink reference signal block (S-RSB) bursts in a sidelink beam measurement gap (SBMG) based at least in part on one or more SBMG configurations;
- wirelessly receiving, from the one or more other UEs, one or more beam reports or beam measurement reports based at least in part on the one or more S-RSB bursts and the one or more SBMG configurations; and
- wirelessly transmitting, to the one or more other UEs, configuration information indicating one or more updated SBMG configurations based at least in part on the one or more beam reports or beam measurement reports.

25. The method of claim 24, further comprising receiving, from the one or more other UEs, UE information indicating, for each UE, of the one or more other UEs, at least one of:
- a monitoring beam list associated with a corresponding UE,
- a sidelink discontinuous reception configuration associated with the corresponding UE,
- a location associated with the corresponding UE,
- a velocity associated with the corresponding UE,
- a device identifier associated with the corresponding UE, or
- a layer 2 fingerprint associated with the corresponding UE.

26. The method of claim 25, wherein the one or more SBMG configurations are based at least in part on the UE information.

27. A method of wireless communication performed by a first user equipment (UE), comprising:

monitoring one or more sidelink reference signal block (S-RSB) bursts in a sidelink beam measurement gap (SBMG) based at least in part on an SBMG configuration;

wirelessly transmitting, to a second UE, a beam report or a beam measurement report based at least in part on the one or more S-RSB bursts and the SBMG configuration; and wirelessly receiving, from the second UE, configuration information indicating an updated SBMG configuration based at least in part on the beam report or the beam measurement report.

28. The method of claim 27, further comprising sensing and selecting resources associated with transmitting the beam report or the beam measurement report based at least in part on the SBMG configuration.

* * * * *